(12) United States Patent
Stout et al.

(10) Patent No.: US 12,051,157 B2
(45) Date of Patent: Jul. 30, 2024

(54) META-BINDING SPATIAL PUBLISHING PLATFORM

(71) Applicant: Yap Studios, LLC, Los Altos, CA (US)

(72) Inventors: Trevor Stout, Los Altos, CA (US); Oliver Wagner, Albuquerque, NM (US)

(73) Assignee: Yap Studios, LLC, Los Altos, CA (US)

( * ) Notice: Subject to any disclaimer, the term of this patent is extended or adjusted under 35 U.S.C. 154(b) by 0 days.

(21) Appl. No.: 17/985,019

(22) Filed: Nov. 10, 2022

(65) Prior Publication Data

US 2023/0154110 A1 May 18, 2023

Related U.S. Application Data

(60) Provisional application No. 63/281,020, filed on Nov. 18, 2021.

(51) Int. Cl.
*G06T 17/20* (2006.01)
*G06F 3/01* (2006.01)
*G06T 15/10* (2011.01)
*G06T 19/00* (2011.01)

(52) U.S. Cl.
CPC .............. *G06T 17/20* (2013.01); *G06F 3/011* (2013.01); *G06T 15/10* (2013.01); *G06T 19/006* (2013.01)

(58) Field of Classification Search
CPC ....... G06T 17/20; G06T 15/10; G06T 19/006; G06F 3/011
See application file for complete search history.

(56) References Cited

U.S. PATENT DOCUMENTS

| | | | |
|---|---|---|---|
| 2013/0261856 A1* | 10/2013 | Sharma | B61L 25/026 701/19 |
| 2020/0351608 A1* | 11/2020 | Padgett | G02B 27/0093 |
| 2021/0331695 A1* | 10/2021 | Ramakrishnan | G06V 10/764 |
| 2021/0405959 A1* | 12/2021 | Lovitt | G10K 15/02 |
| 2022/0189060 A1* | 6/2022 | Türkoglu | G06T 7/11 |
| 2023/0096417 A1* | 3/2023 | Mullican | G06T 19/20 382/103 |

\* cited by examiner

*Primary Examiner* — Lixi C Simpson
(74) *Attorney, Agent, or Firm* — Carr & Ferrell LLP

(57) ABSTRACT

The present technology pertains to systems and methods for creating and mapping three-dimensional spaces to provide an interactive experience with physical spaces and objects. Preferred embodiments of the method include generating a geometric layout by scanning a physical space; overlaying the geometric layout onto a virtual three-dimensional map of the physical space, the three-dimensional map supported by a content management system; defining an anchor in the three-dimensional map; associating a content with the anchor; receiving, from a device in within the physical space, the device's physical location and orientation; determining, by the content management system, a device location within the three-dimensional map; and outputting to the device, when the device is near and orientated with the anchor, the content associated with the anchor or an indication of the content associated with the anchor.

31 Claims, 38 Drawing Sheets

META-BINDING SPATIAL PUBLISHING PLATFORM

CROSS REFERENCE TO RELATED APPLICATION

The present application claims the priority benefit of U.S. Provisional Patent Application Ser. No. 63/281,020, filed on Nov. 18, 2021, titled "Meta-Binding Spatial Publishing Platform". This application is hereby incorporated by reference in its entirety, including all appendices.

FIELD OF INVENTION

The present technology pertains to systems and methods for creating and mapping three-dimensional spaces to provide a user interactive experience with physical or virtual spaces and objects. In particular, but not by way of limitation, the present technology provides a meta-binding spatial publishing platform (referred to herein as "SPP").

SUMMARY

In some embodiments the present technology is directed to a method for creating a 3D virtual space based on physical locations and objects to facilitate virtual interactive experiences, the method comprising: generating a geometric layout by scanning a physical space; overlaying the geometric layout onto a virtual three-dimensional map of the physical space, the three-dimensional map supported by a content management system; defining an anchor in the three-dimensional map; associating a content with the anchor; receiving, from a device in within the physical space, the device's physical location and orientation; determining, by the content management system, a device location within the three-dimensional map; and outputting to the device, when the device is near and orientated with the anchor, the content associated with the anchor or an indication of the content associated with the anchor.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
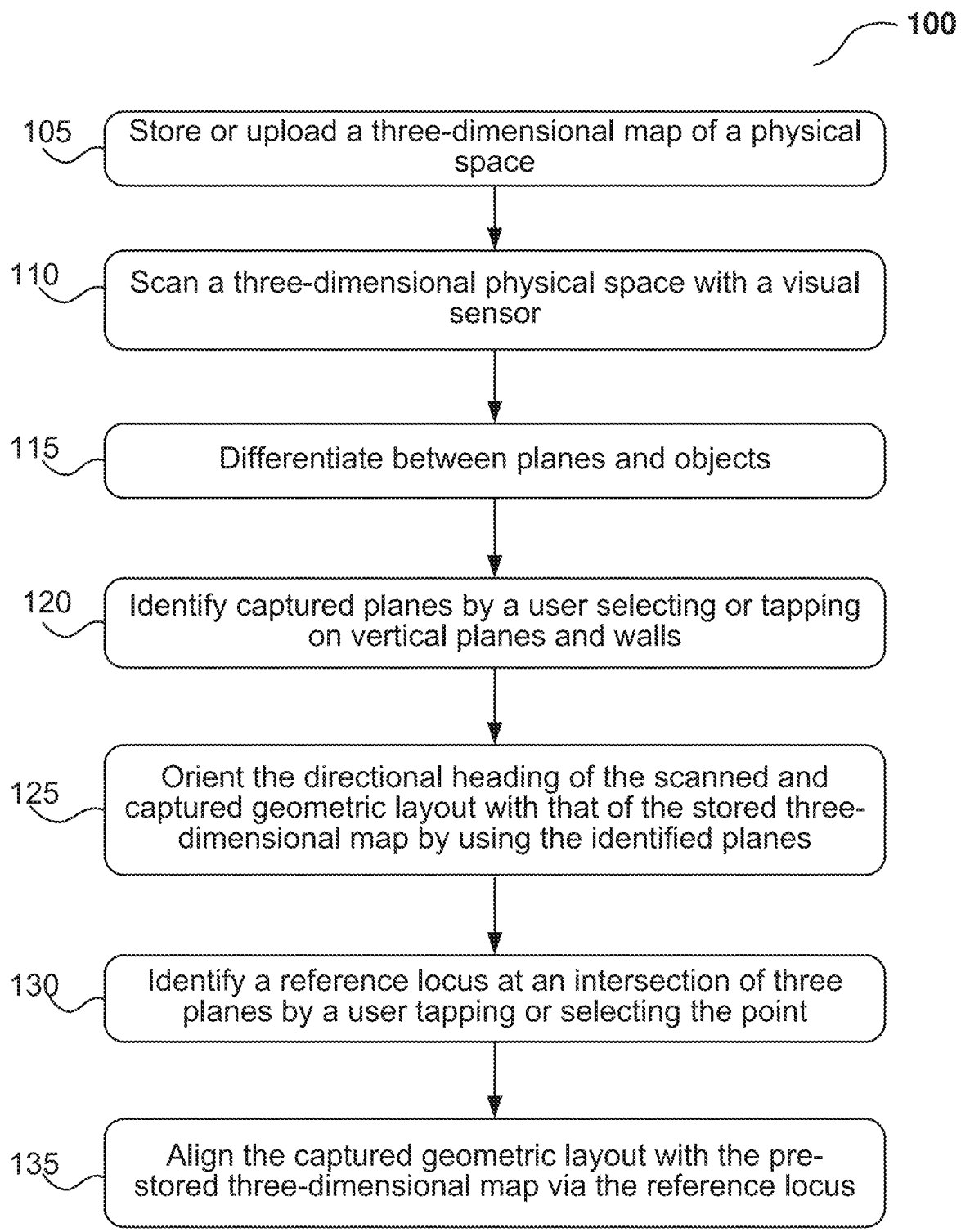

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 presents a flow diagram of one embodiment of a method to create a virtual space based on a counterpart physical space.

Figure 2:
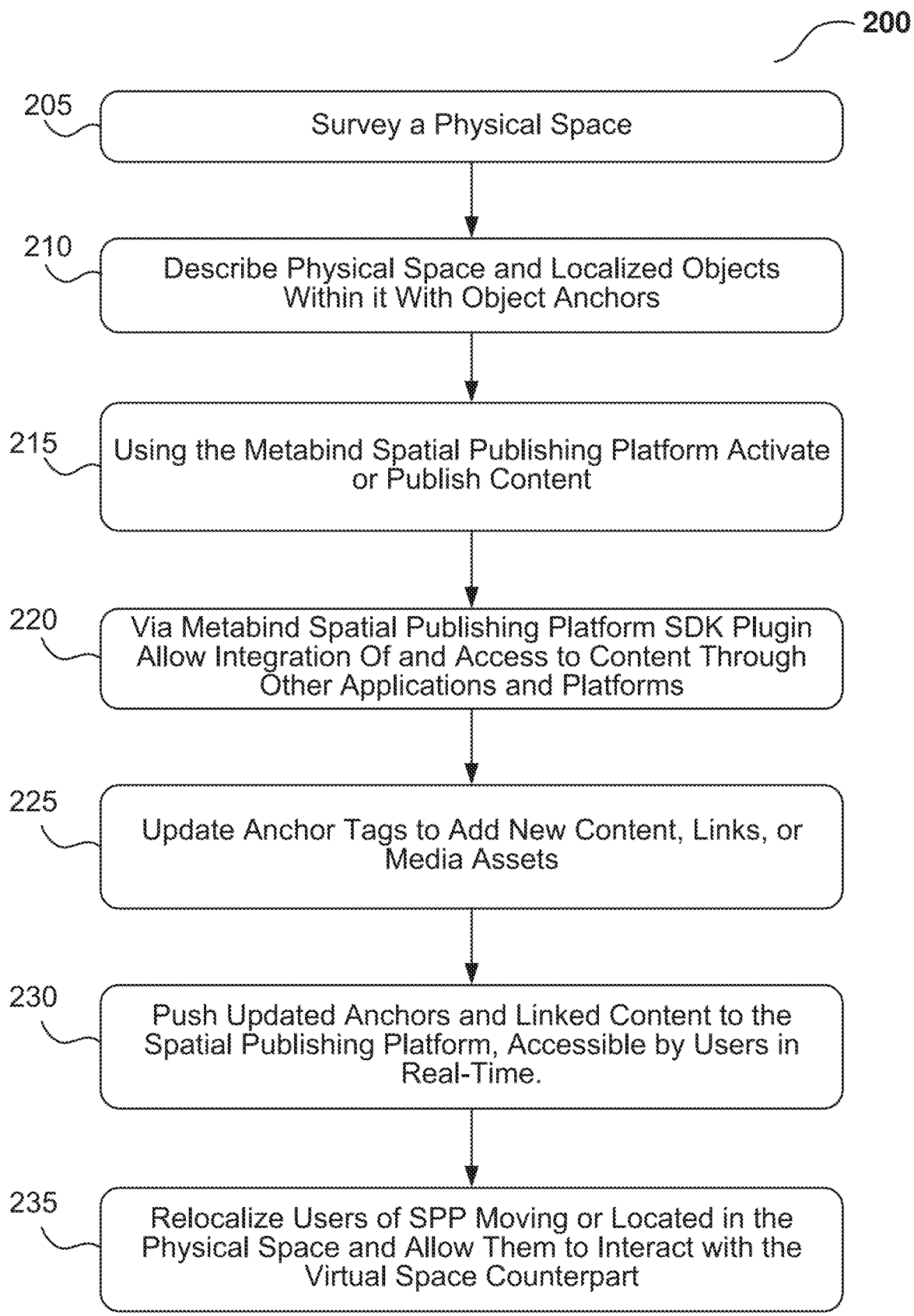

FIG. 2 presents a flow diagram of one embodiment of a method for an owner/operator to publish virtual spaces and associated content through SPP.

Figure 3:
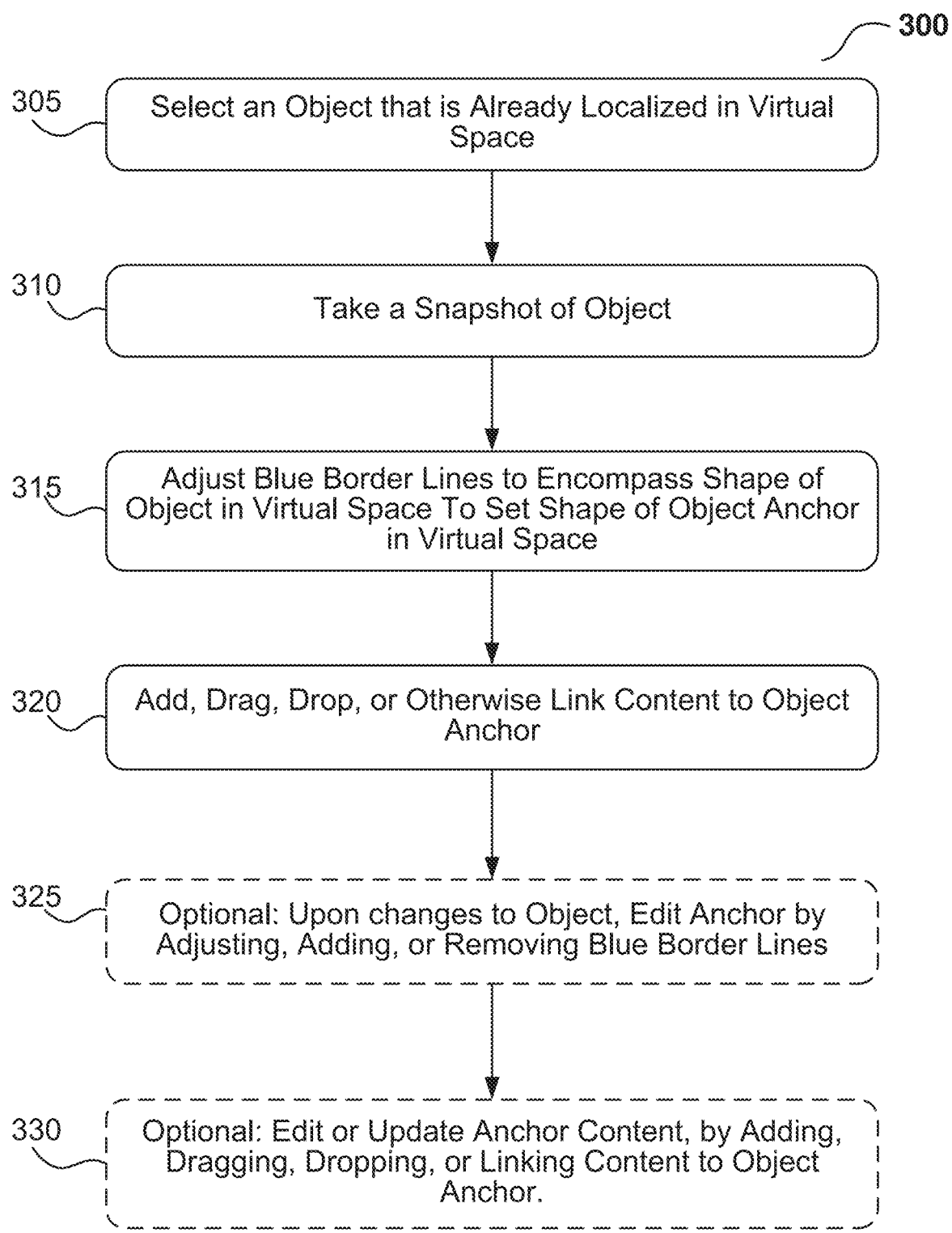

FIG. 3 presents a flow diagram of one embodiment of how objects may be anchored to the created virtual space.

Figure 4:
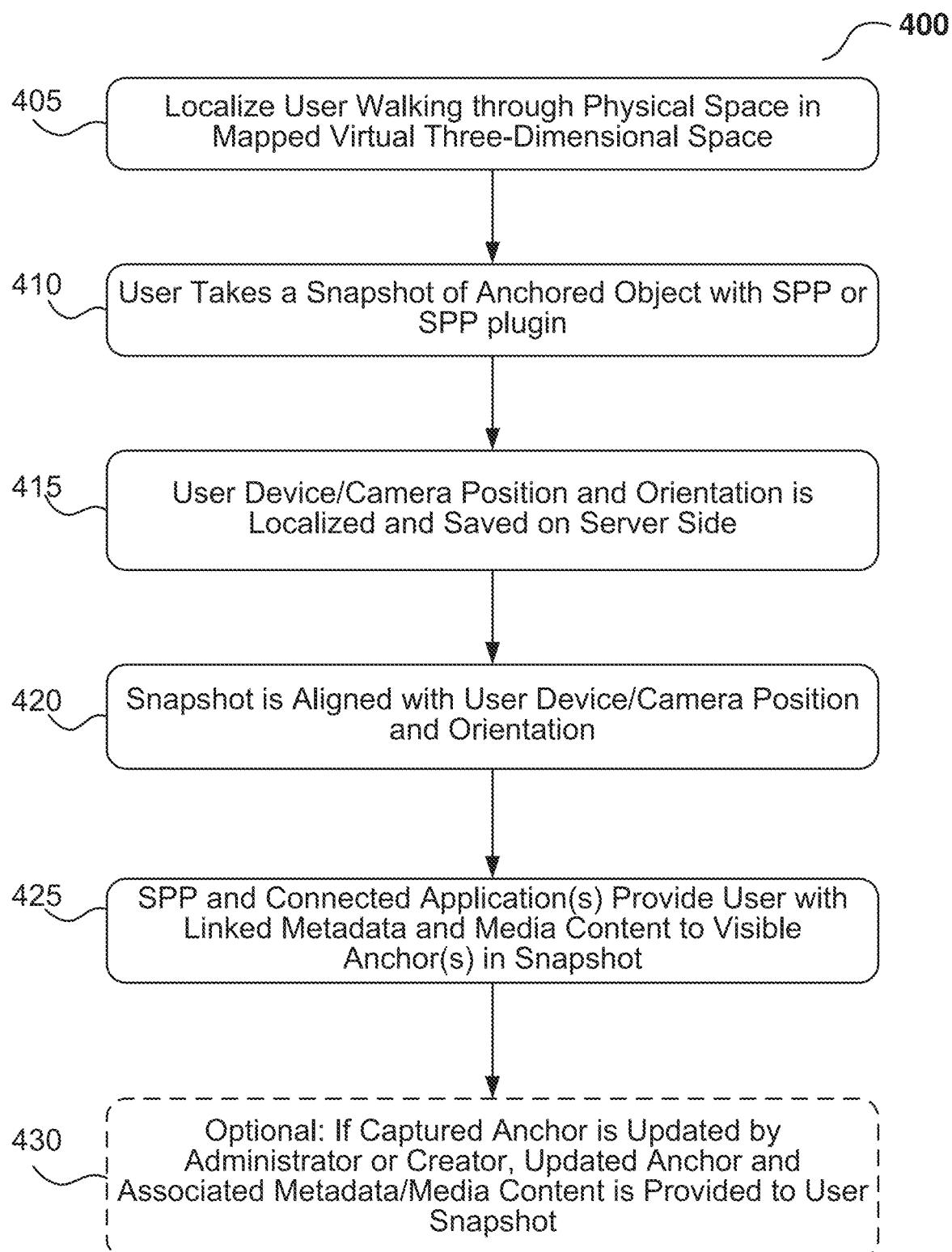

FIG. 4 presents one embodiment of a method of a consumer interacting with a virtual space.

Figure 5:
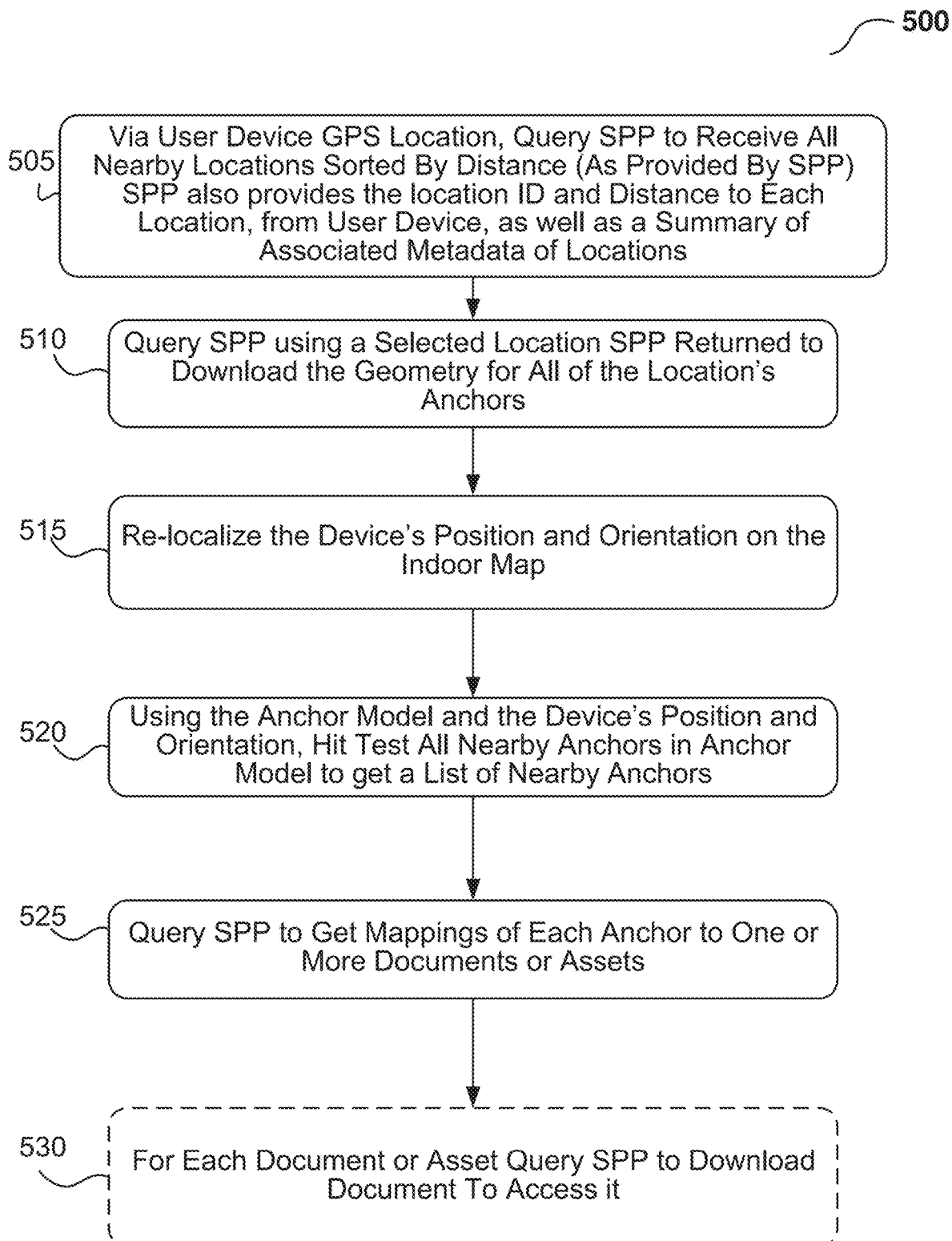

FIG. 5. Presents an embodiment of a method to localize a user in a mapped virtual location.

Figure 6:
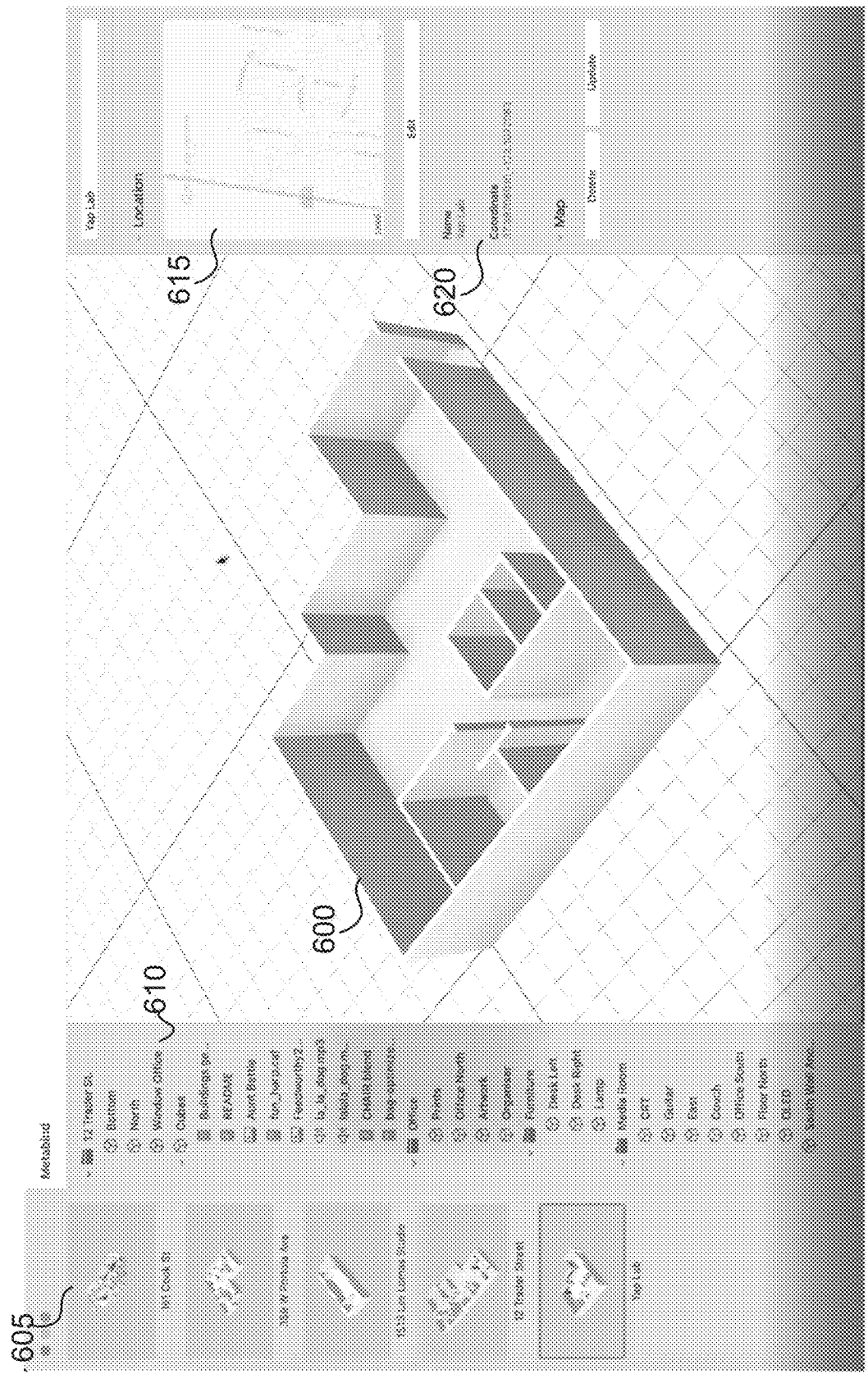

FIG. 6 presents one embodiment of a three-dimensional map model created by surveying a physical space.

Figure 7:

FIG. 7 presents a view of the survey window on the SPP application.

Figure 8:
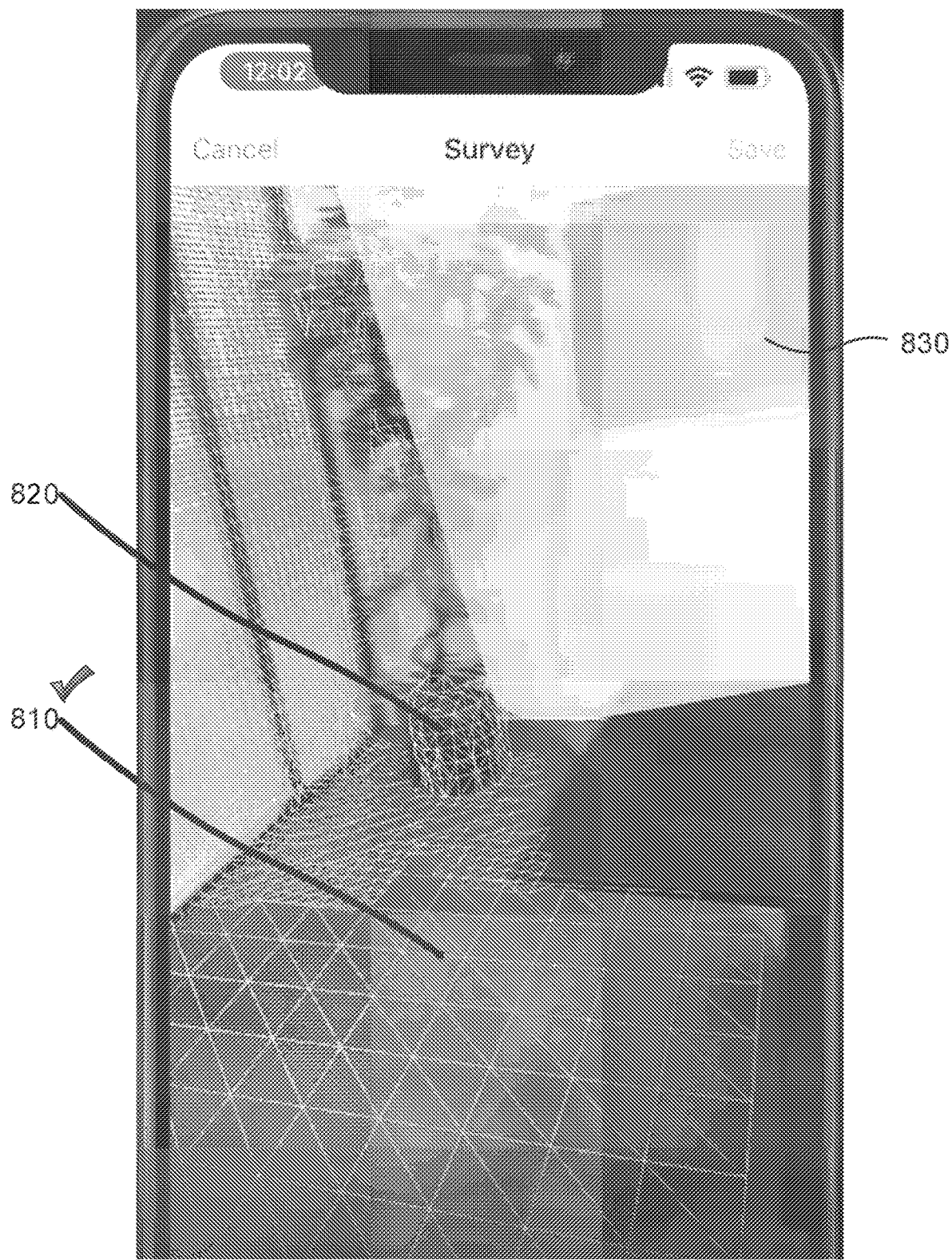

FIG. 8 presents a survey scan process in progress.

Figure 9:

FIG. 9 presents another view of the physical space during the survey scan in progress.

Figure 10:
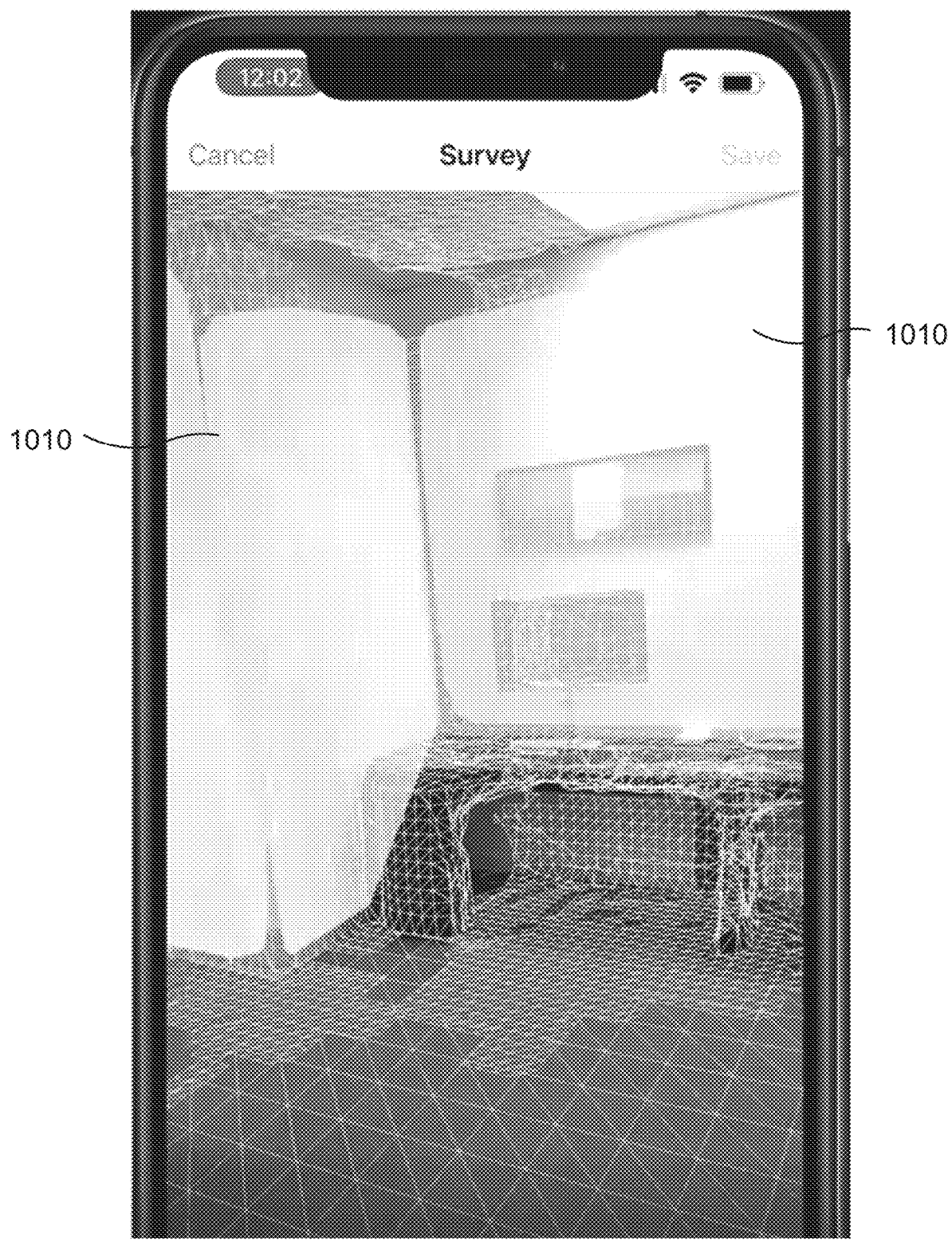

FIG. 10 presents another view of the physical space during the survey scan in progress.

Figure 11:
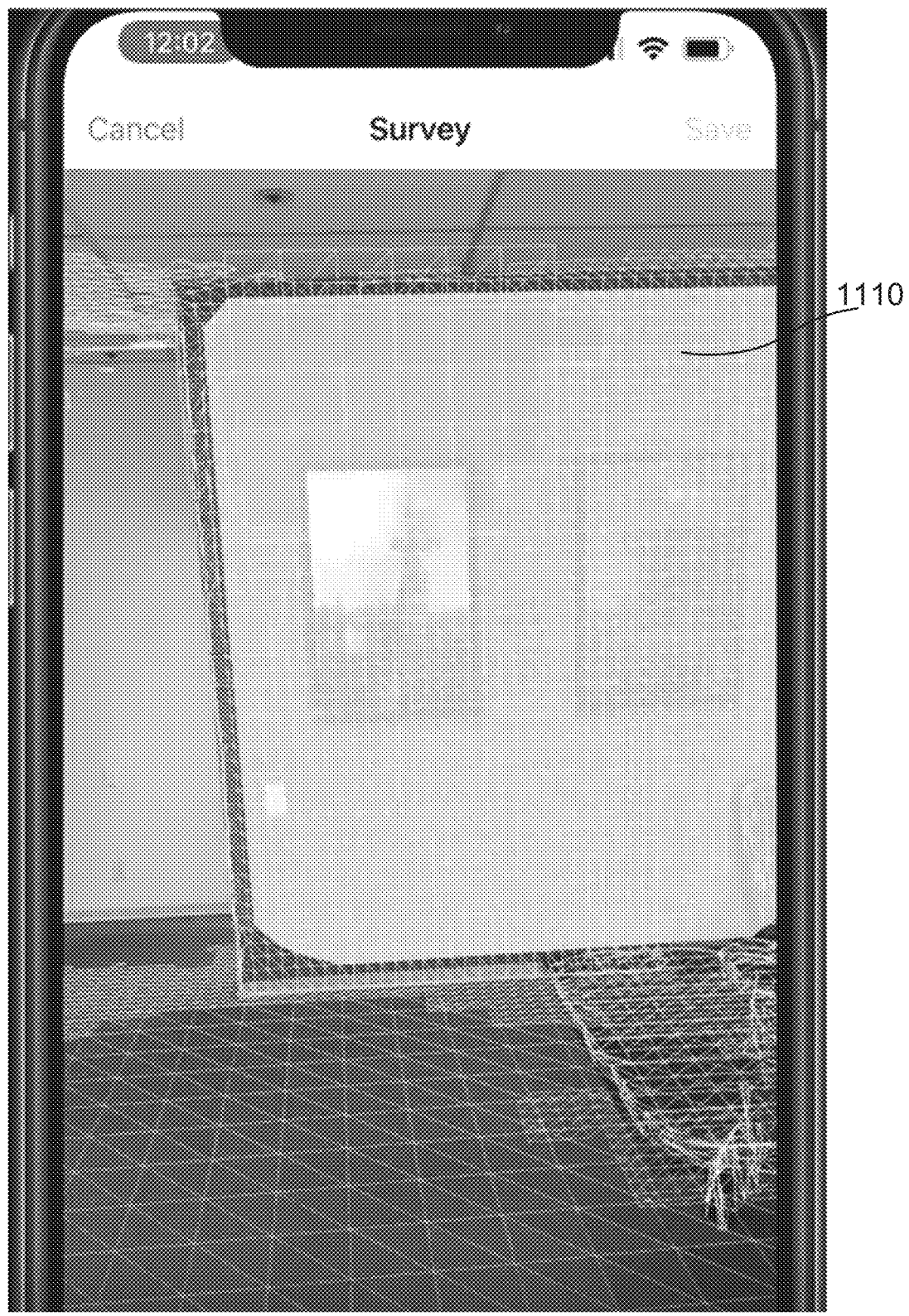

FIG. 11 presents another view of the physical space during the survey scan in progress.

Figure 12:
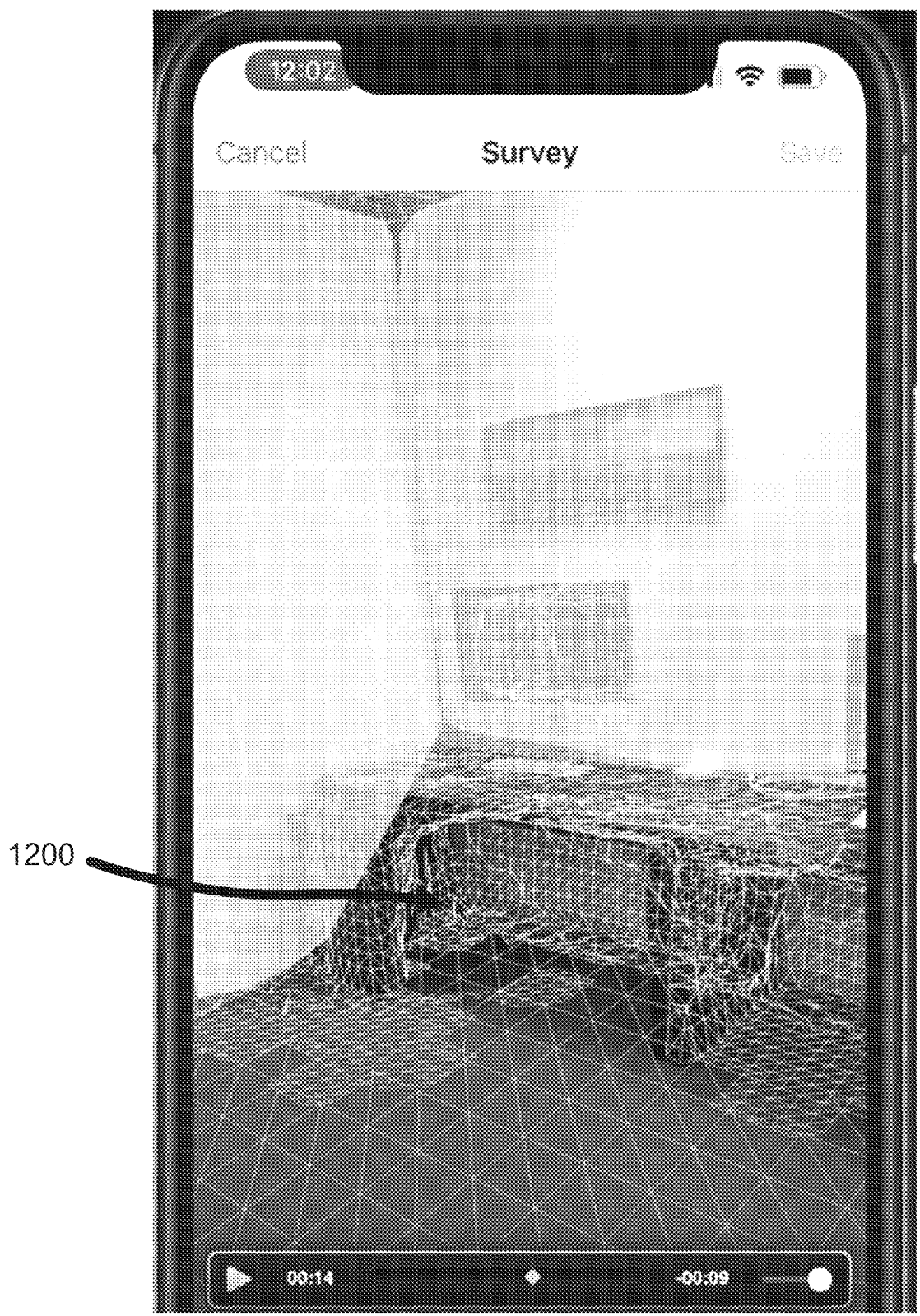

FIG. 12 presents another view of the survey scan in progress.

Figure 13:
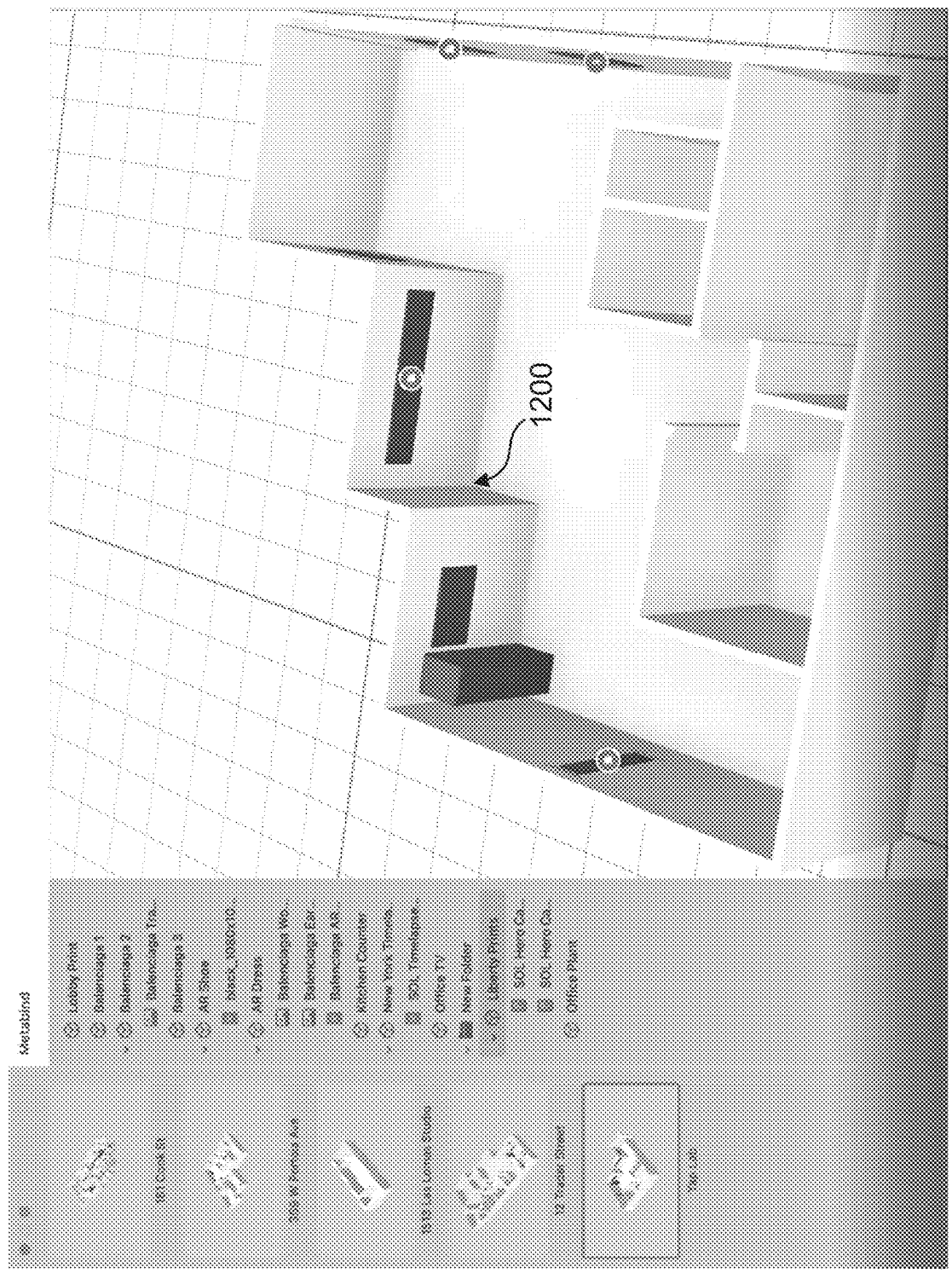

FIG. 13 presents another view of the survey scan showing a reference point.

Figure 14:
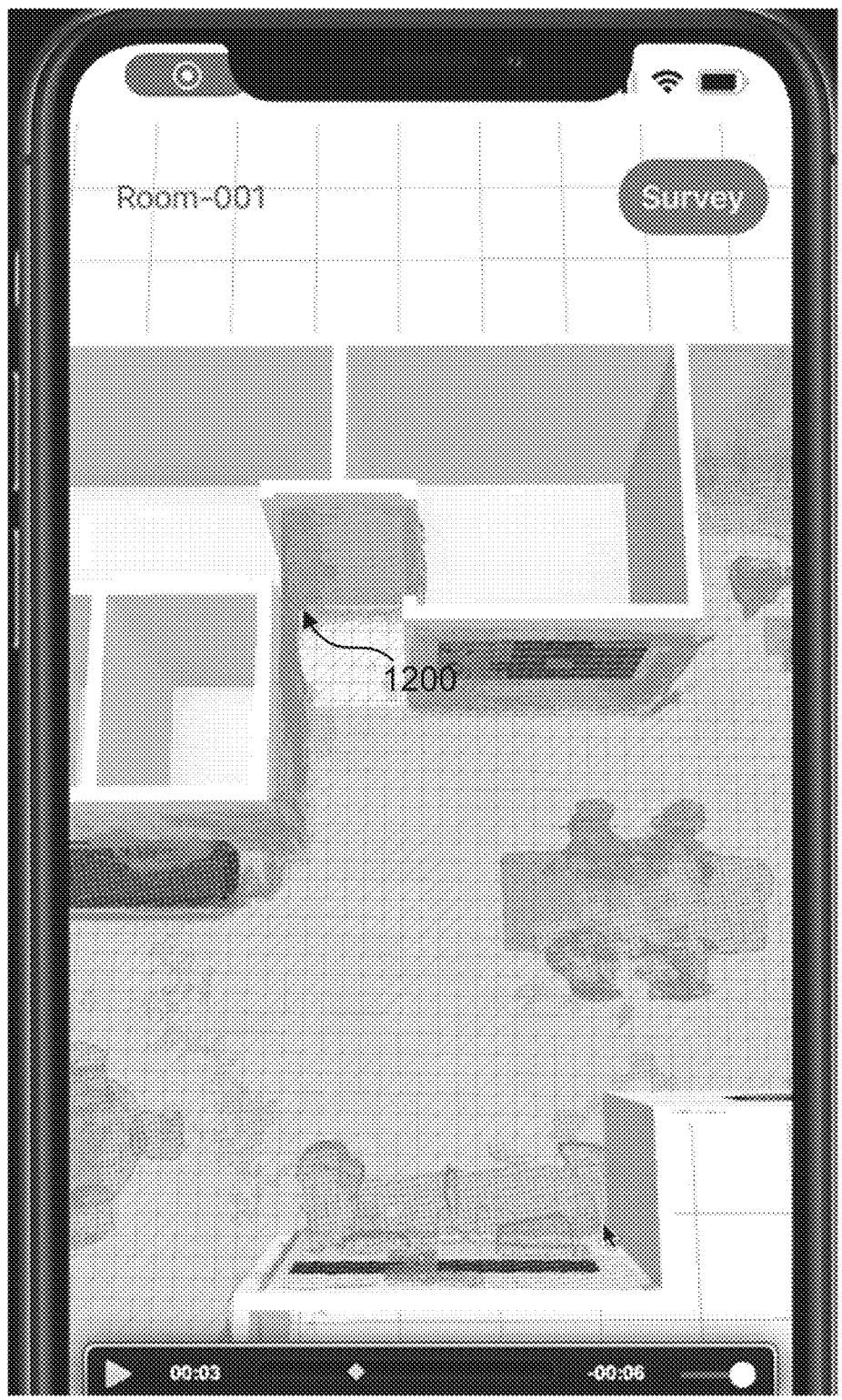

FIG. 14 presents a completed AR scan overlayed on a three-dimensional virtual model of the physical space.

Figure 15:
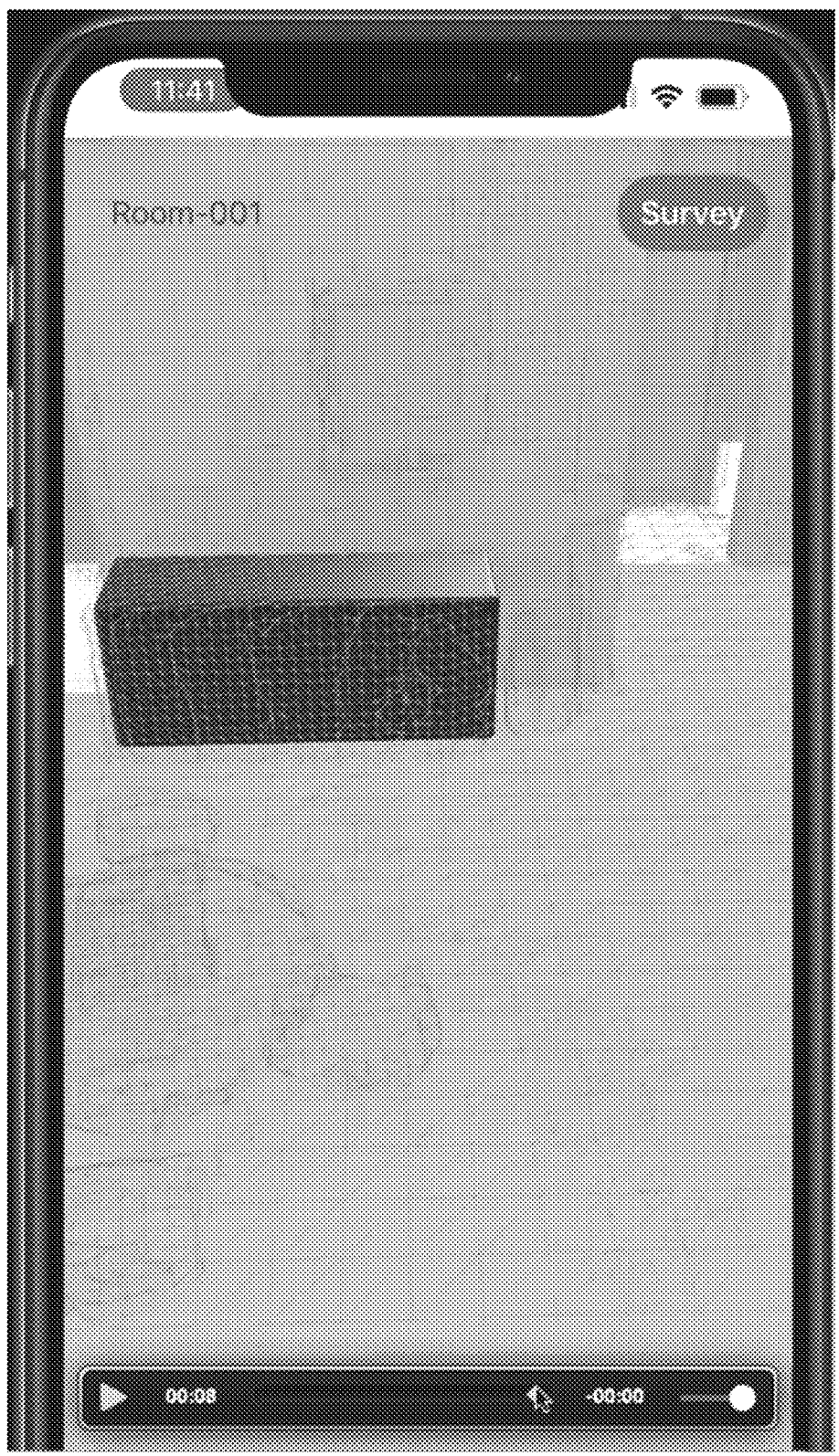

FIG. 15 presents a first-person view of the combined AR scan and three-dimensional map model.

Figure 16:
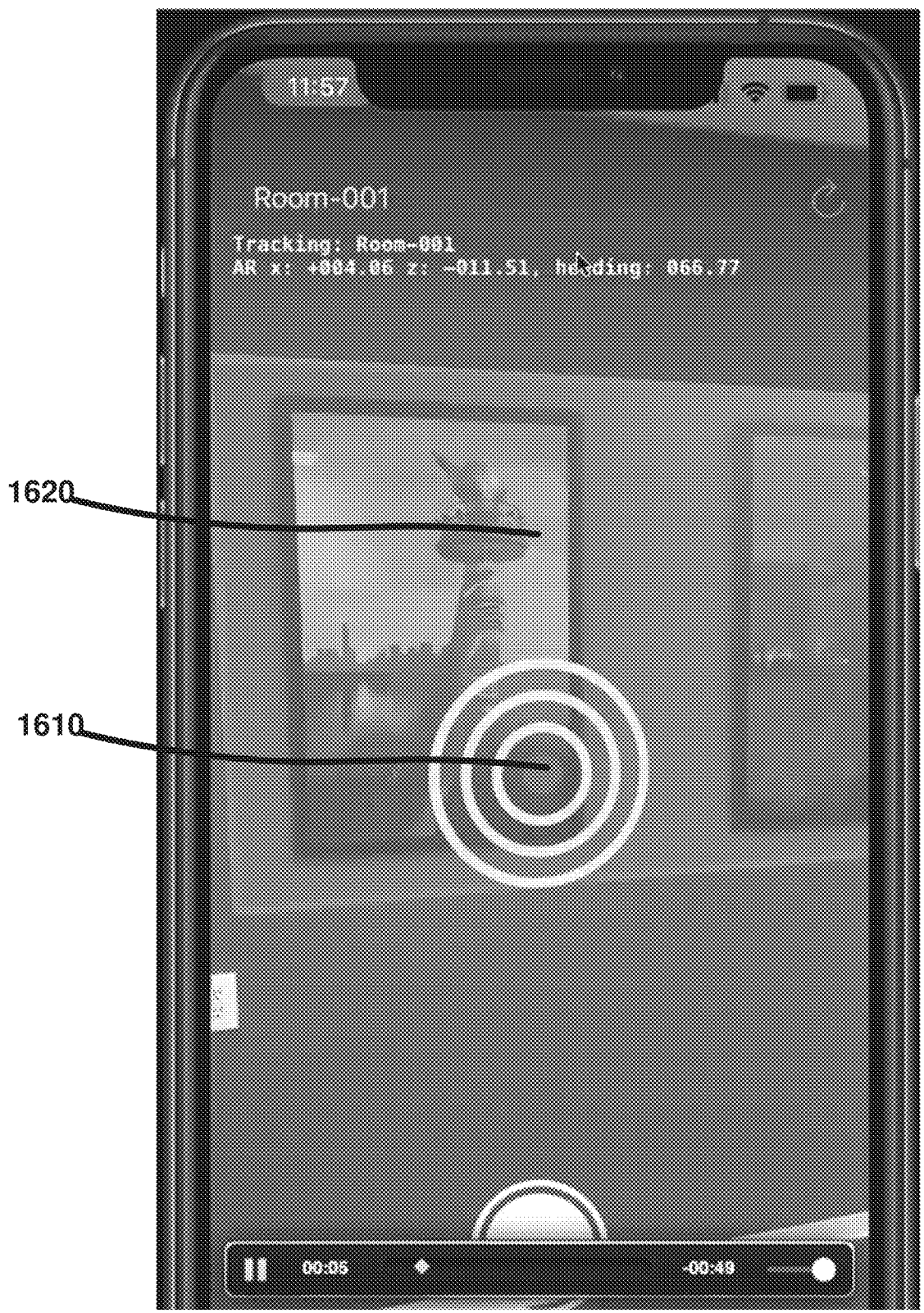

FIG. 16 presents a first person view through the application running SPP after the AR scan and three-dimensional map are oriented and aligned together.

Figure 17:
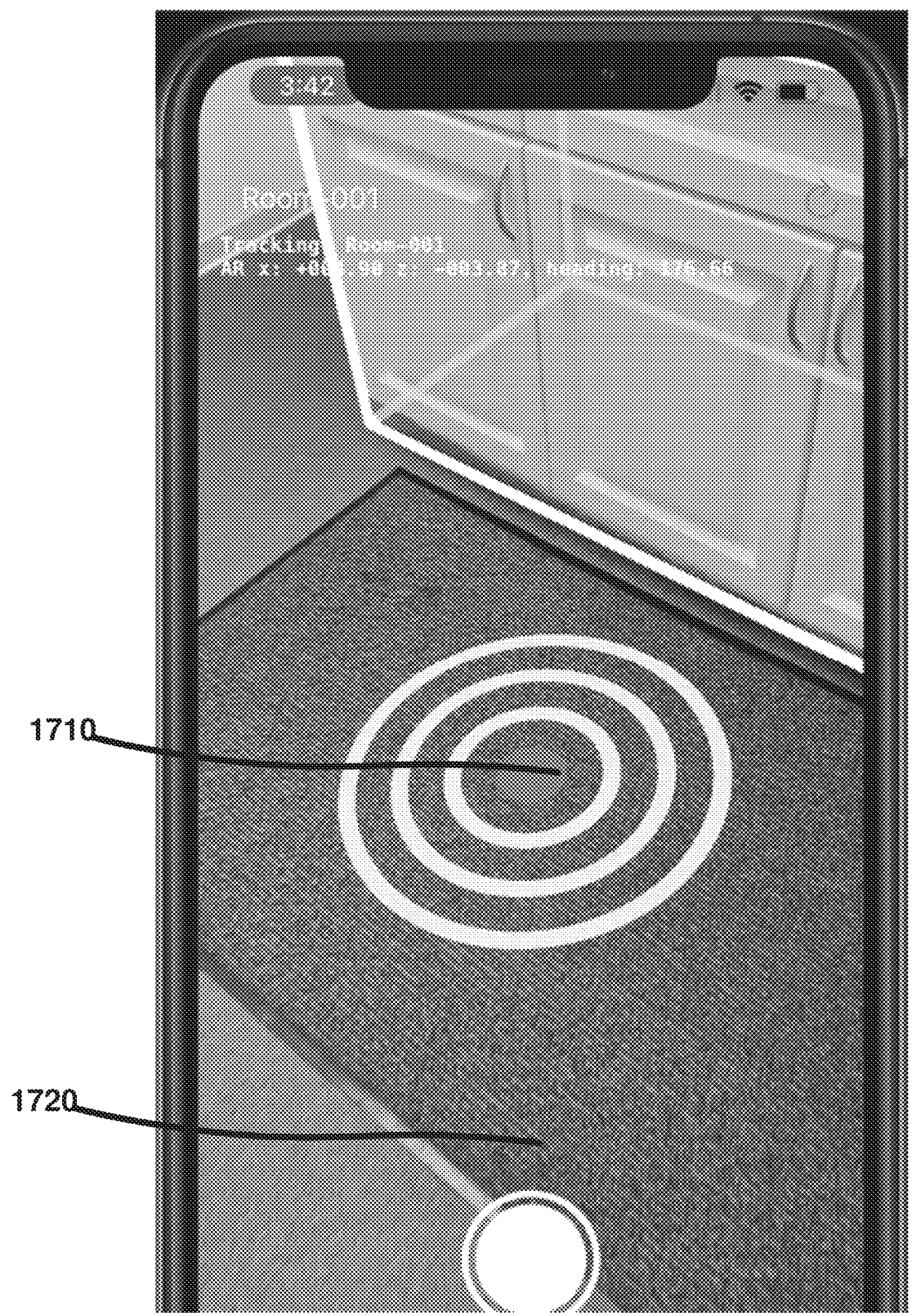

FIG. 17 presents a first person view through the application running SPP after the AR scan and three-dimensional map are oriented and aligned together.

Figure 18:
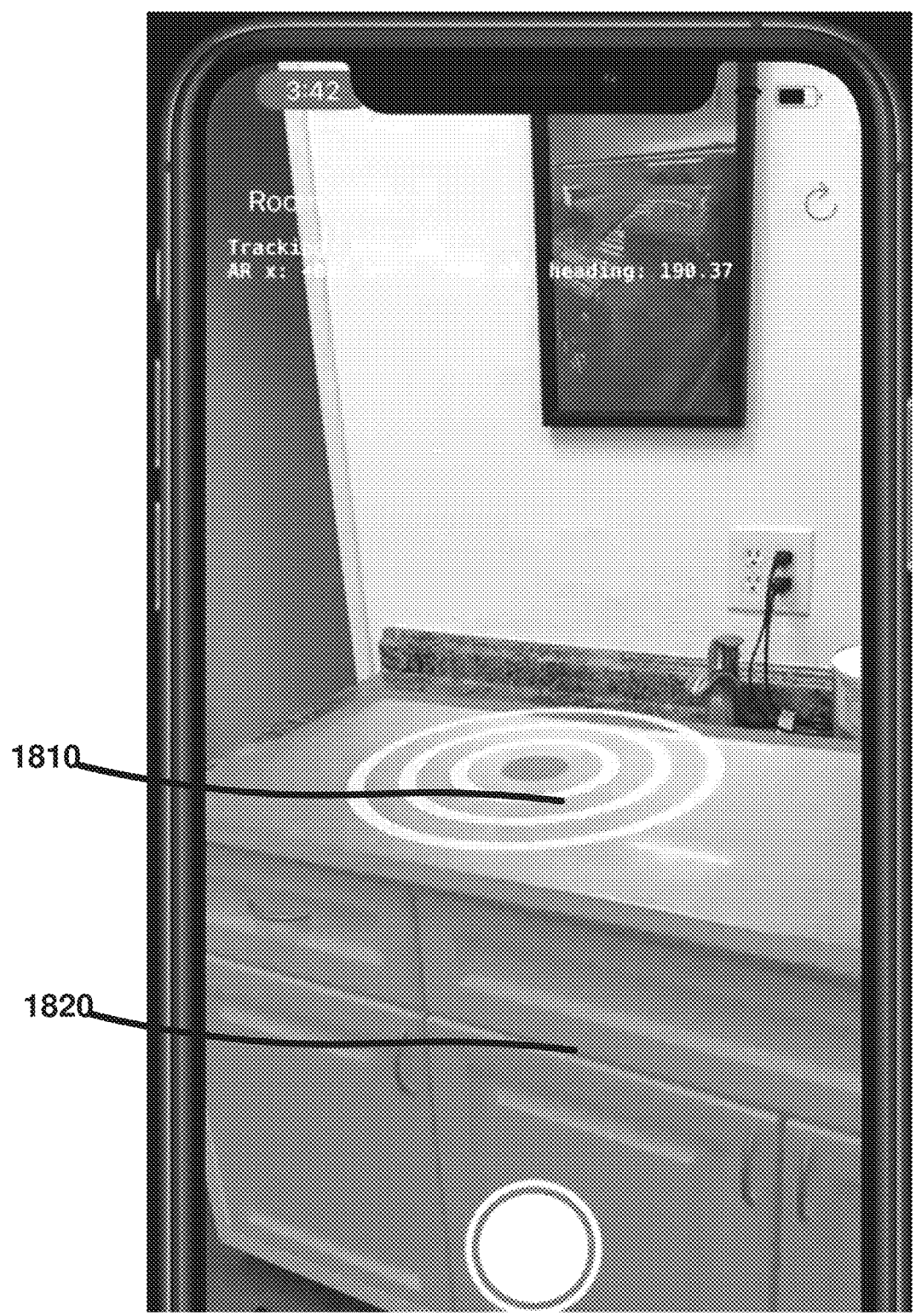

FIG. 18 presents a first person view through the application running SPP after the AR scan and three-dimensional map are oriented and aligned together.

Figure 19:
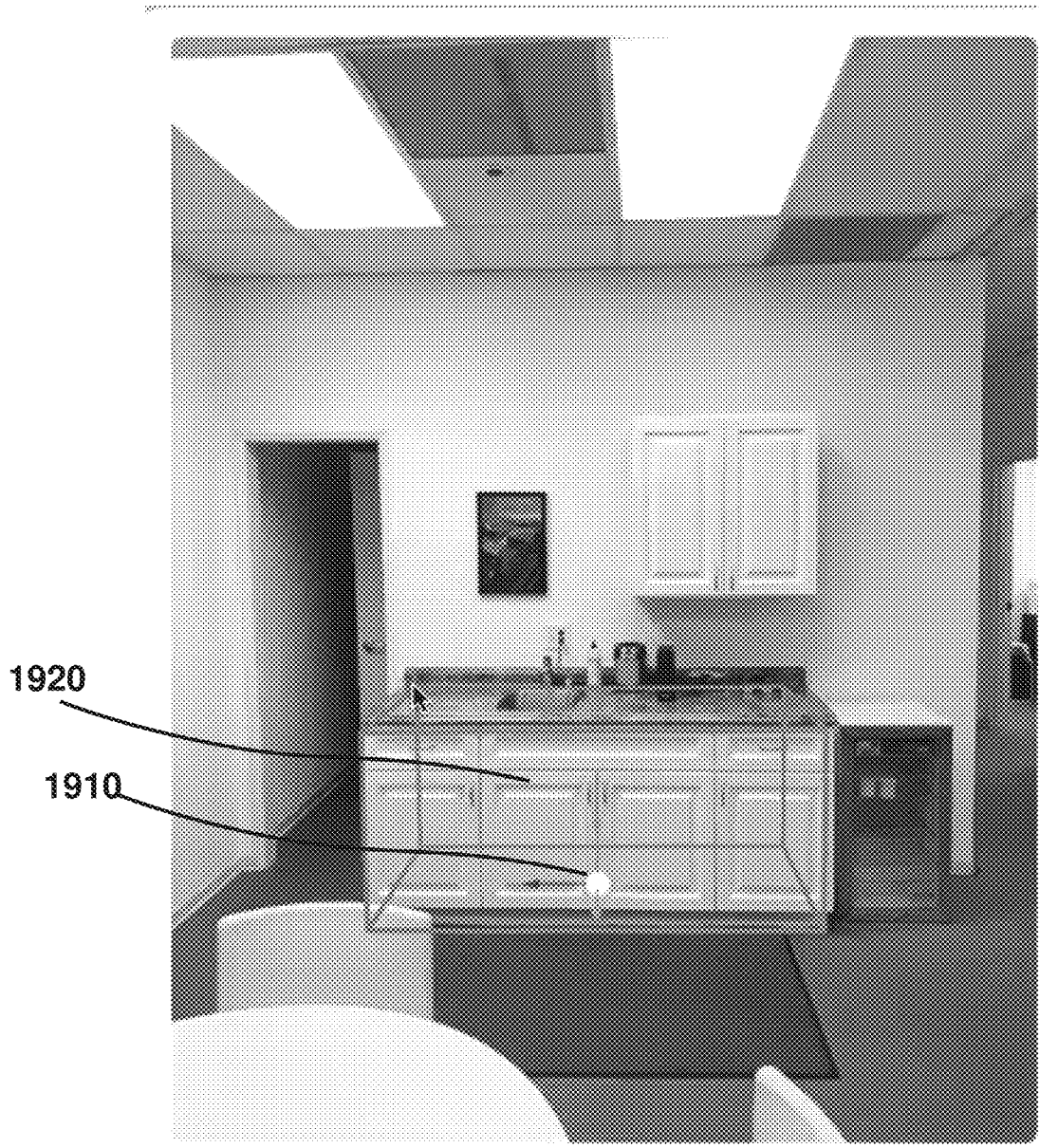

FIG. 19 presents one view of an embodiment of creating an object anchor or anchoring an object for a mapped physical space.

Figure 20:
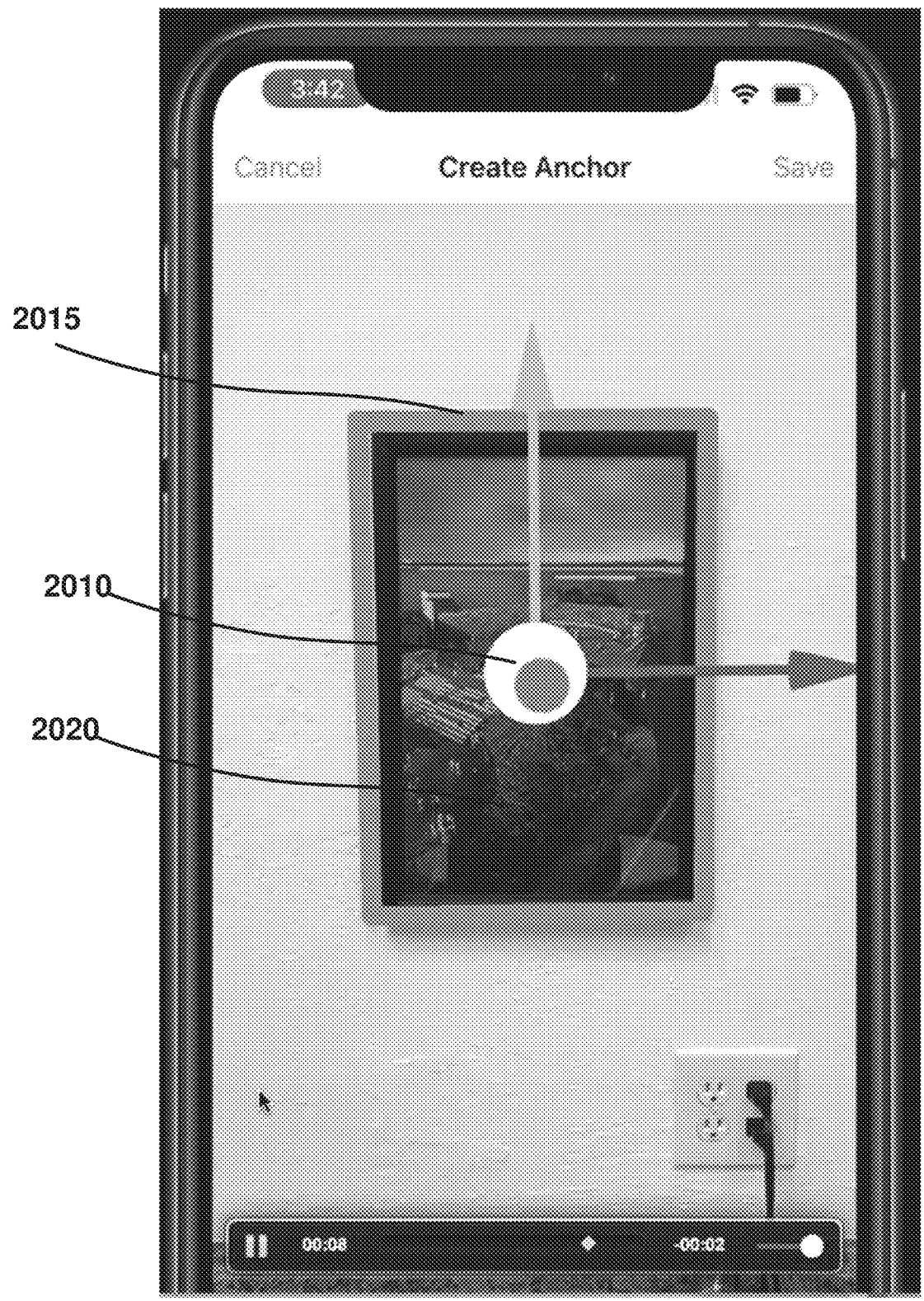

FIG. 20 presents another view of anchoring an object.

Figure 21:
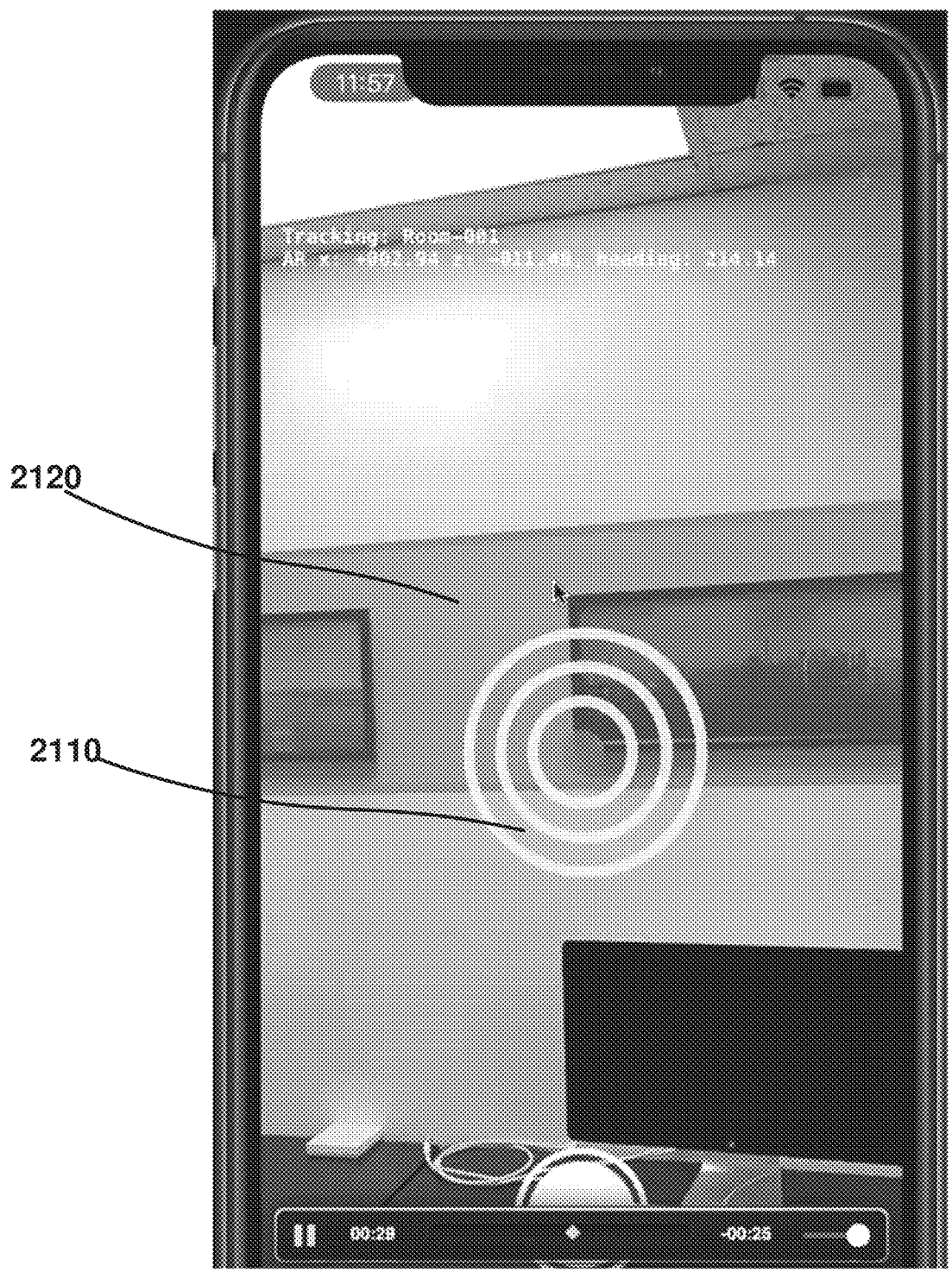

FIG. 21 presents a first-person AR view of a tracker.

Figure 22:
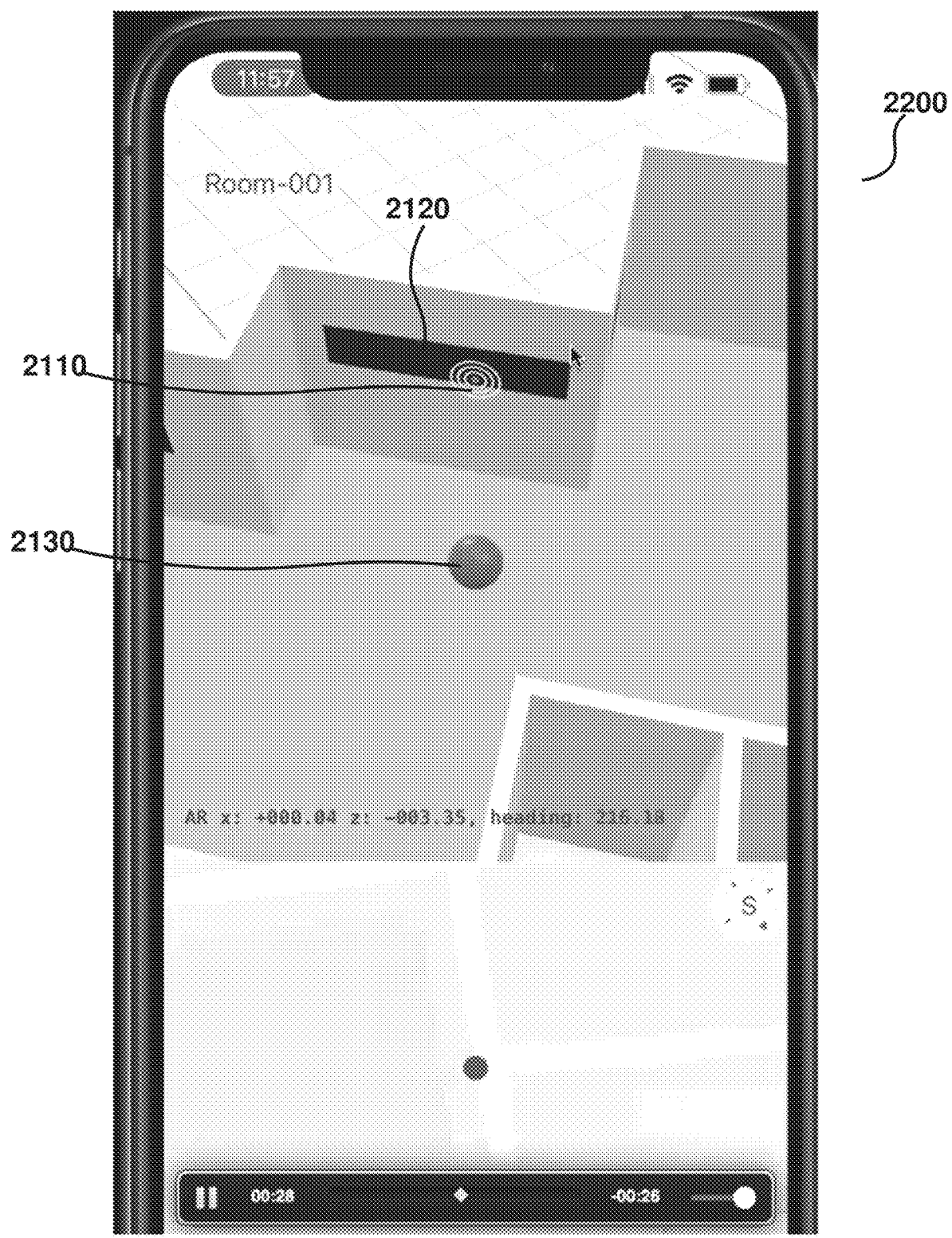

FIG. 22 presents the three-dimensional model view of FIG. 21.

Figure 23:
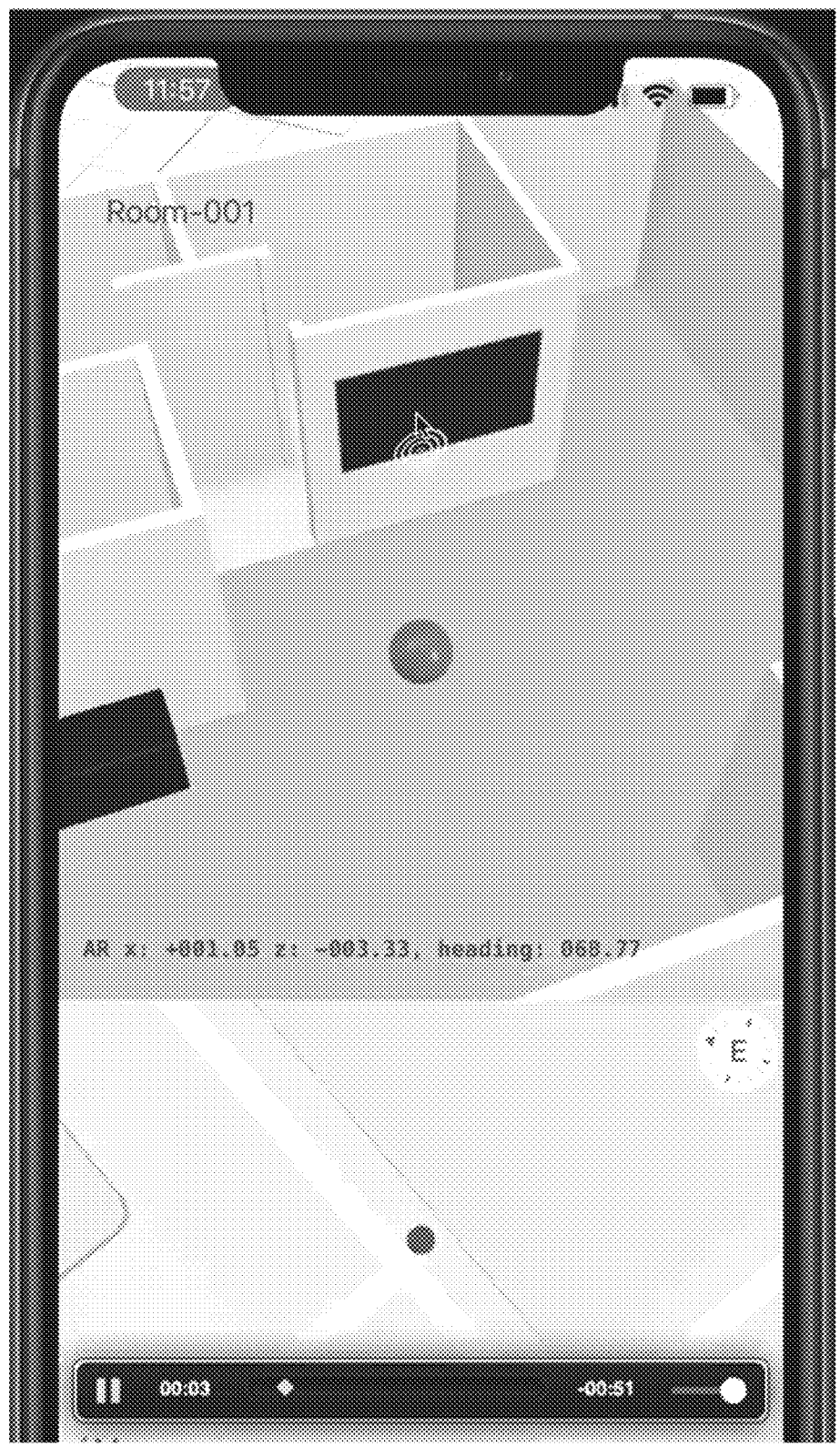

FIG. 23 presents another three-dimensional map view of a user that is localized in a surveyed and mapped physical space.

Figure 24:
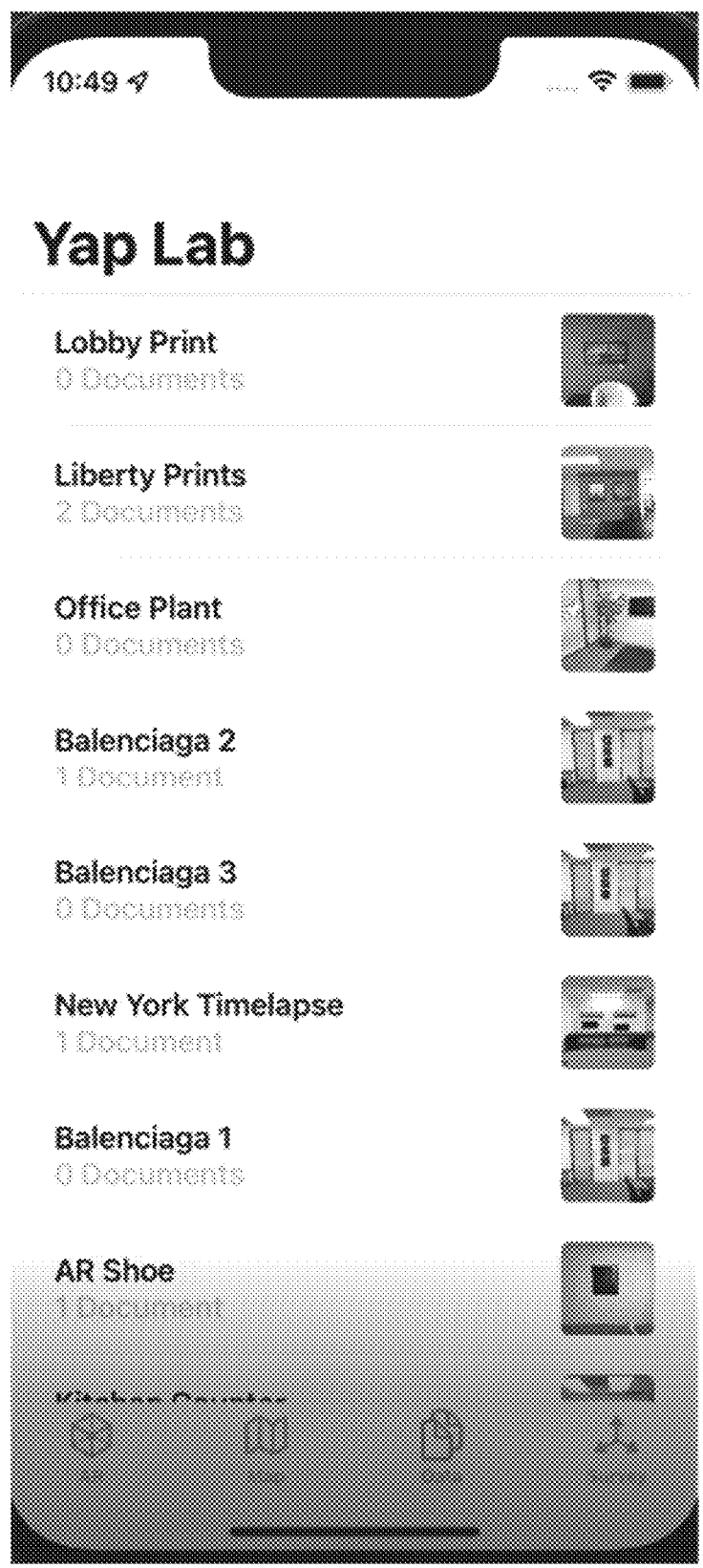

FIG. 24 presents an image of one embodiment of a user interface listing all object anchors.

Figure 25:
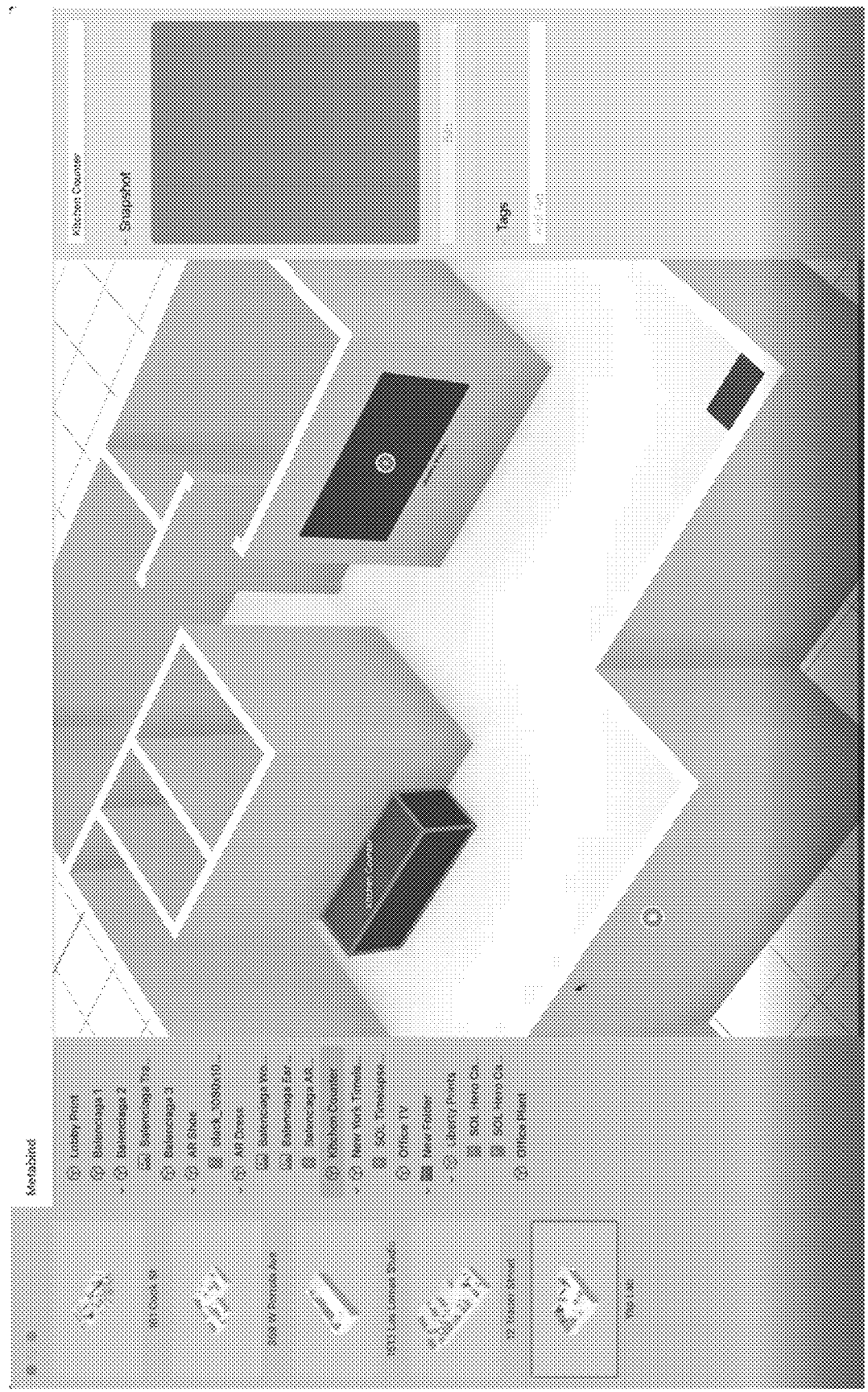

FIG. 25 presents a view of a combined three-dimensional map and surveyed space.

Figure 26:
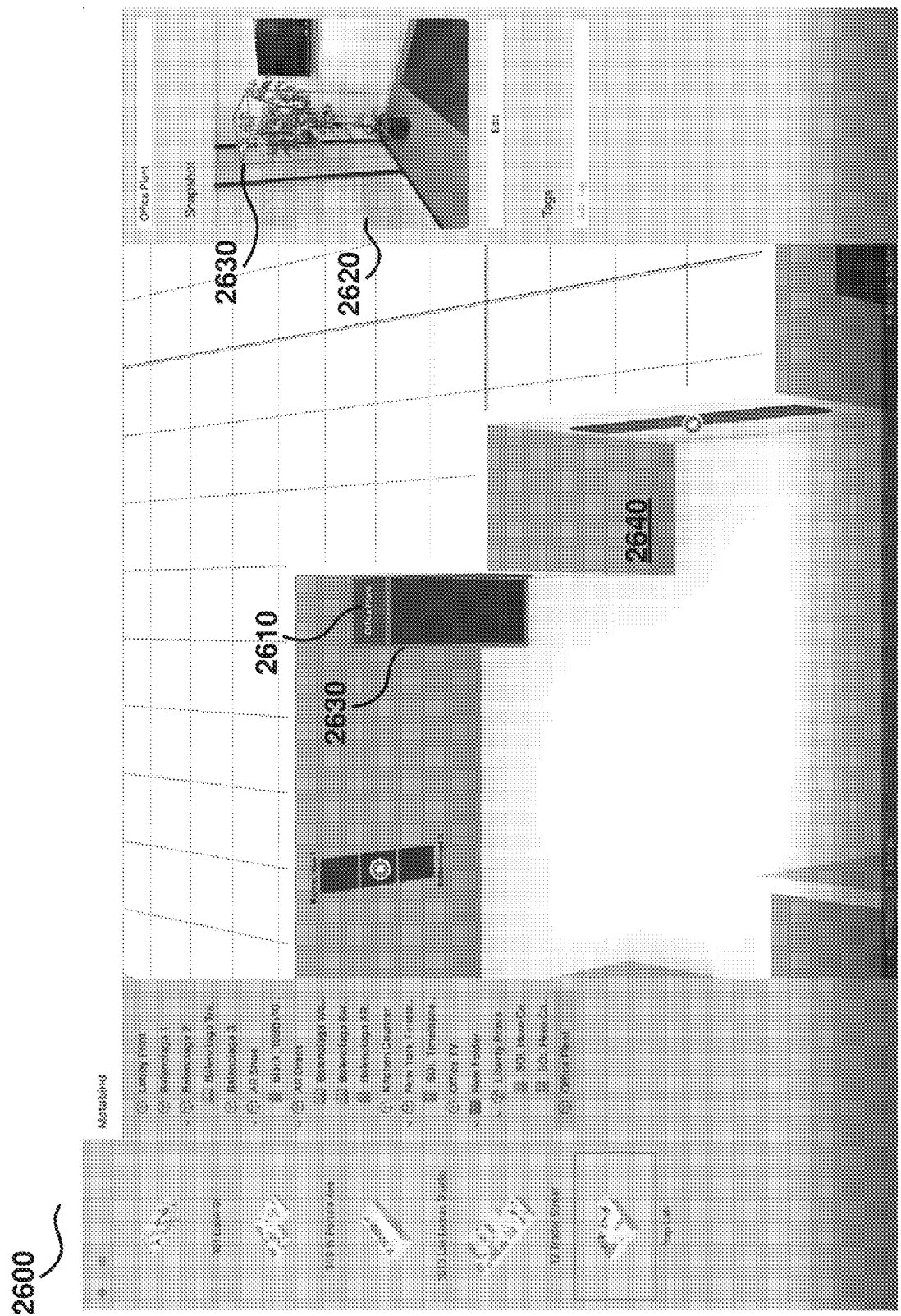

FIG. 26 presents another view of an SPP interface showing an SPP virtual map model.

Figure 27:
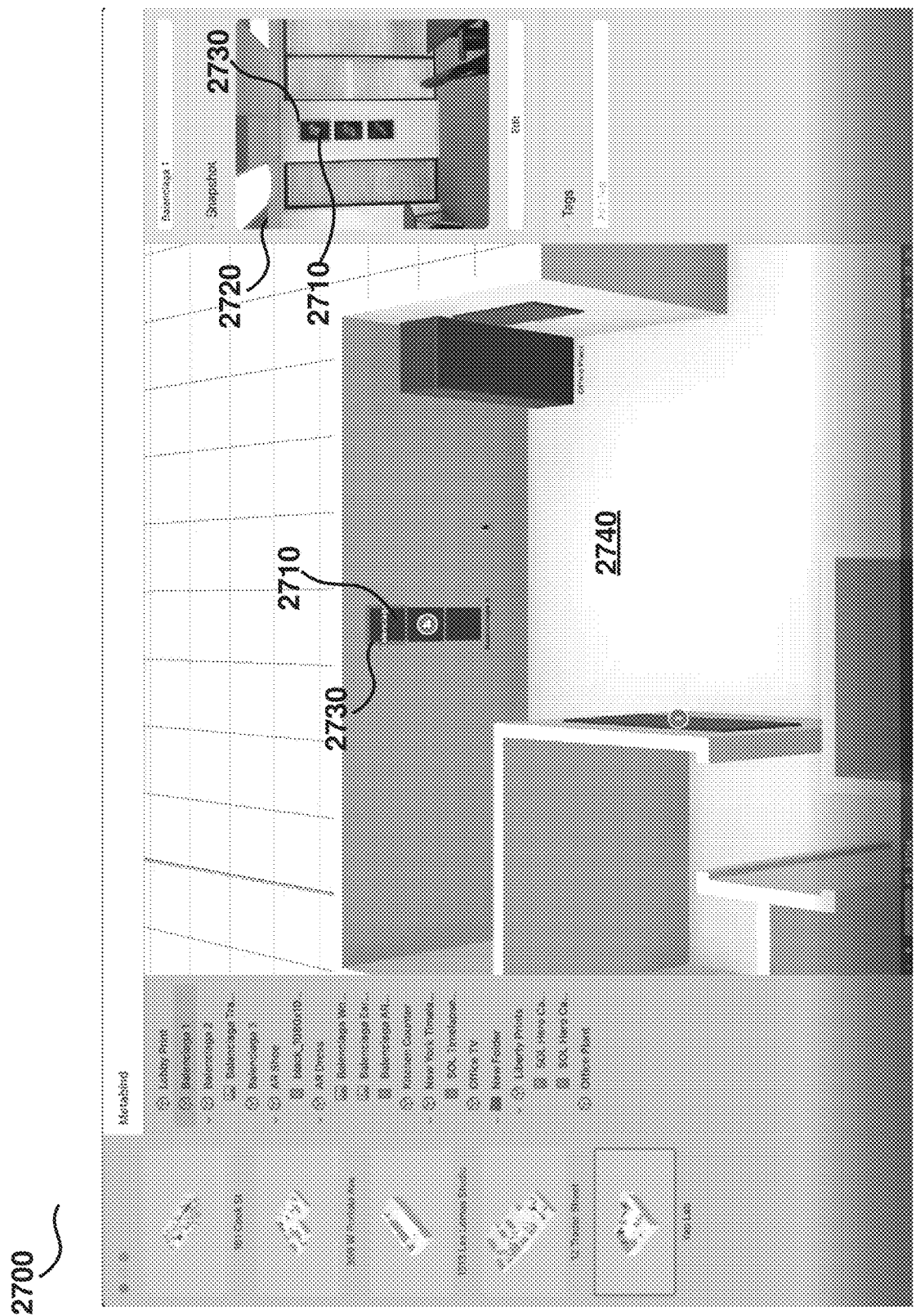

FIG. 27 presents another view of an SPP interface showing an SPP virtual map model.

Figure 28:
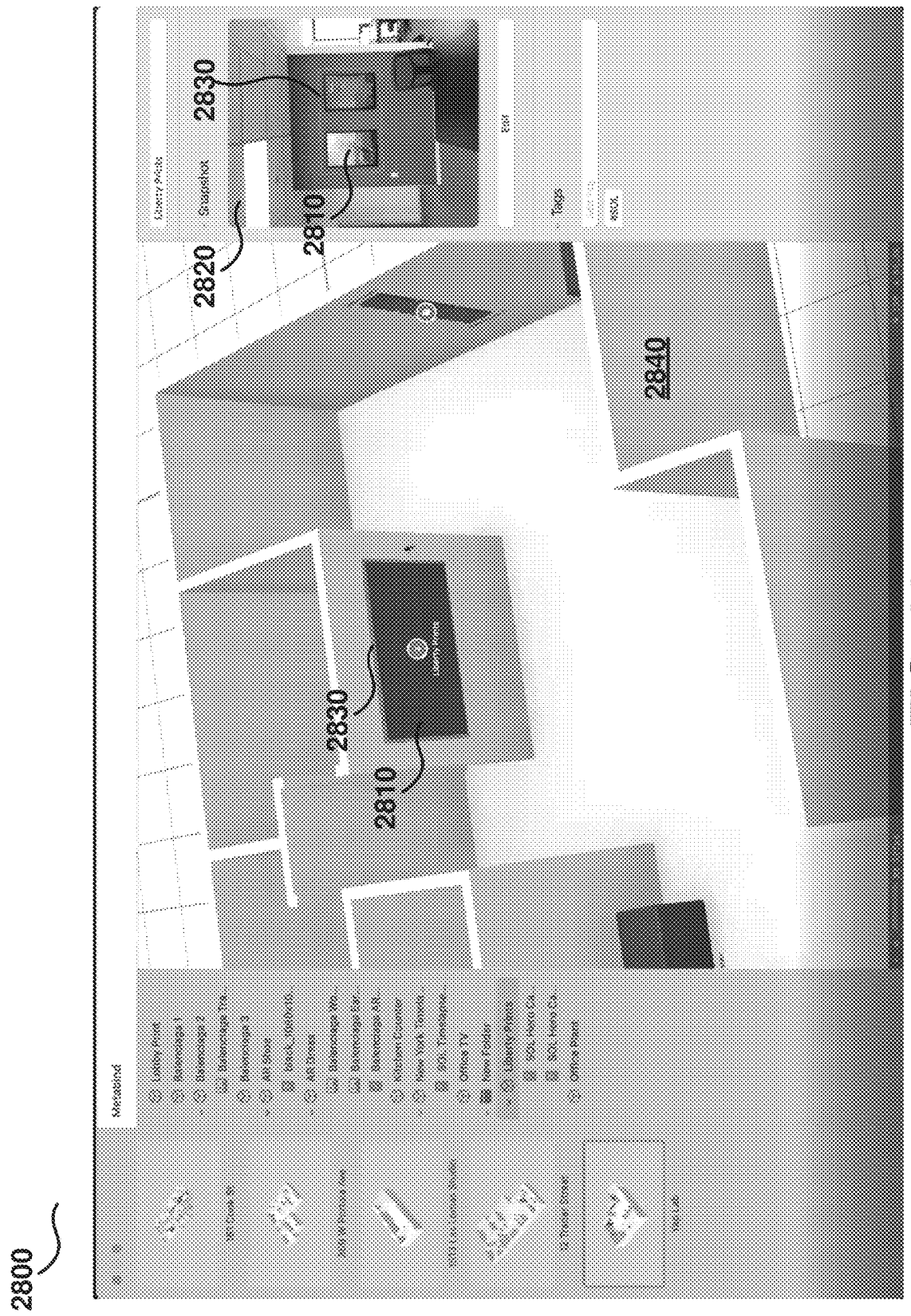

FIG. 28 presents another view of an SPP interface 2800 showing an SPP virtual map model.

Figure 29A:
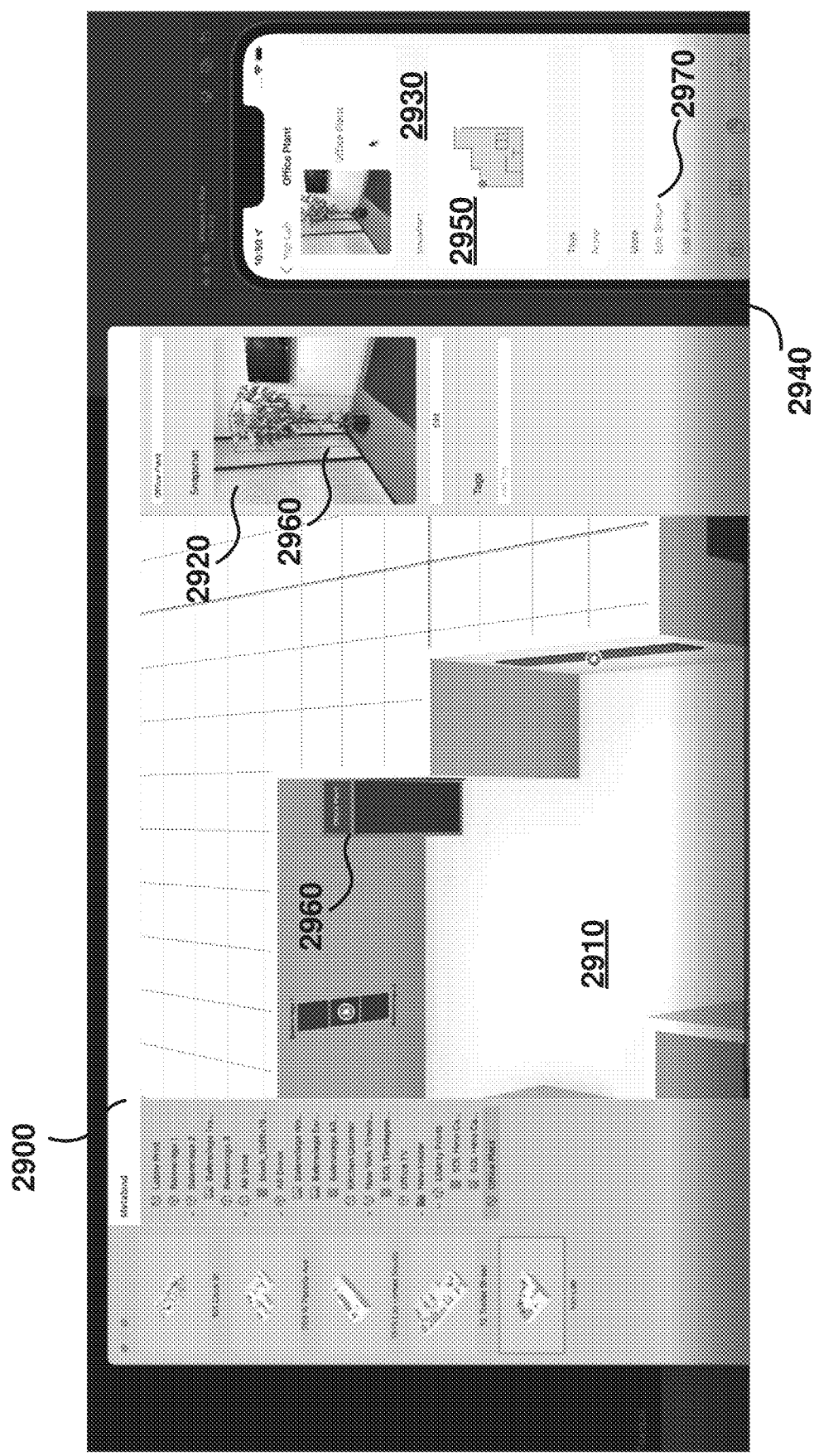
Figure 29B:
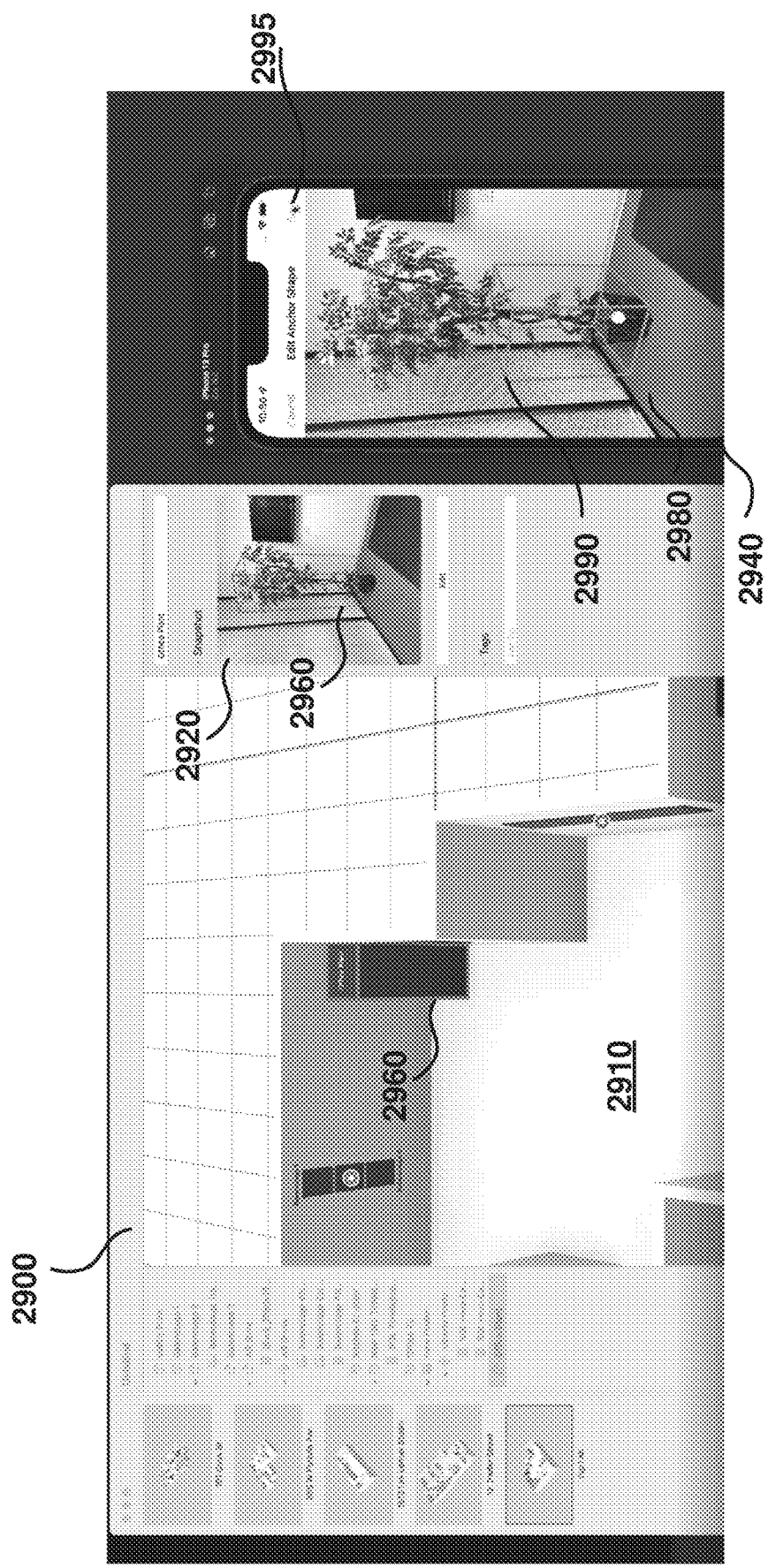
Figure 29C:
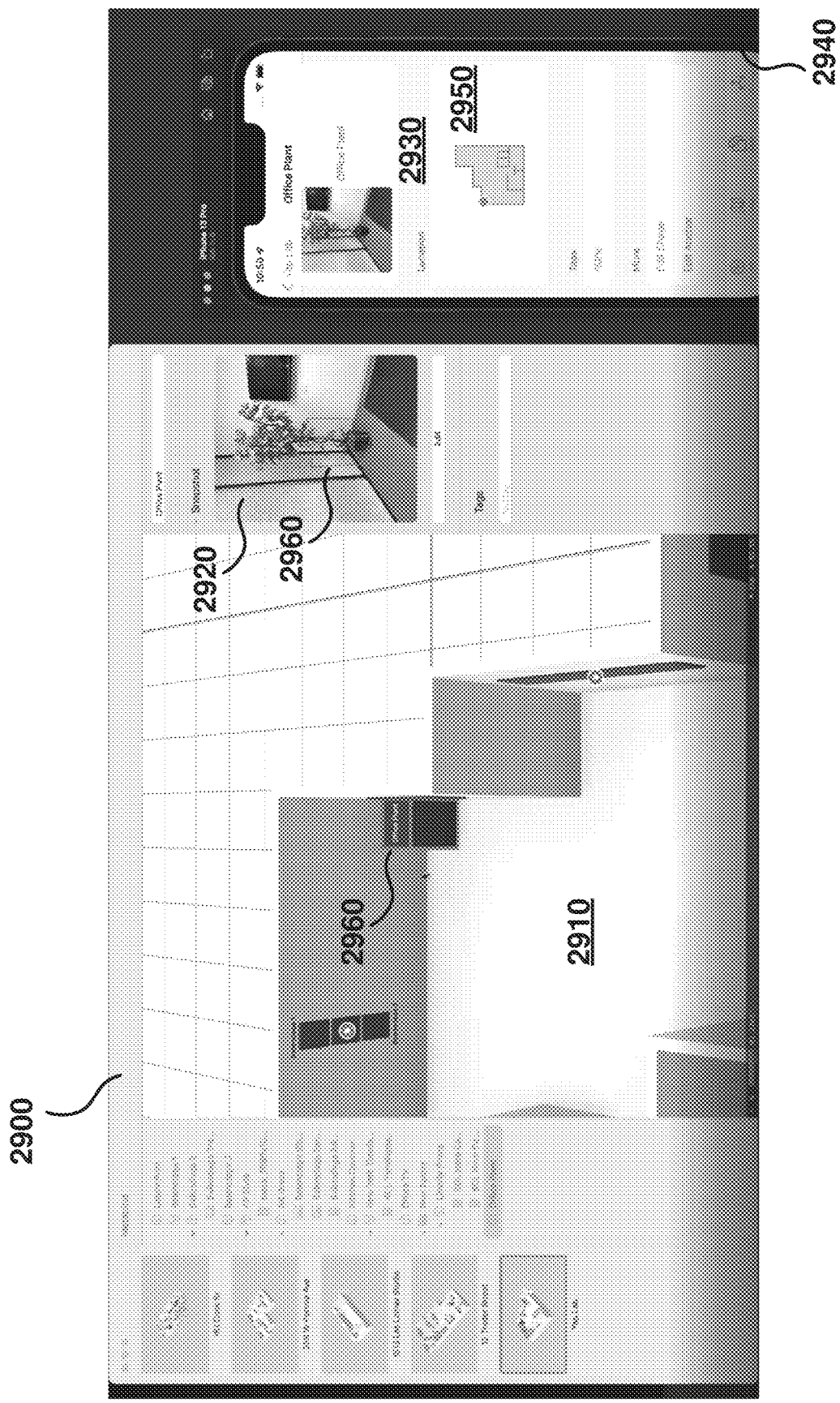

FIGS. 29A-29C present images that show the consecutive steps in editing or altering an anchor and its borders and how this is updated and displayed to users.

FIGS. 30A-30F present end-user experience when interacting with the SPP platform virtual space while navigating mapped physical space.

Figure 31:
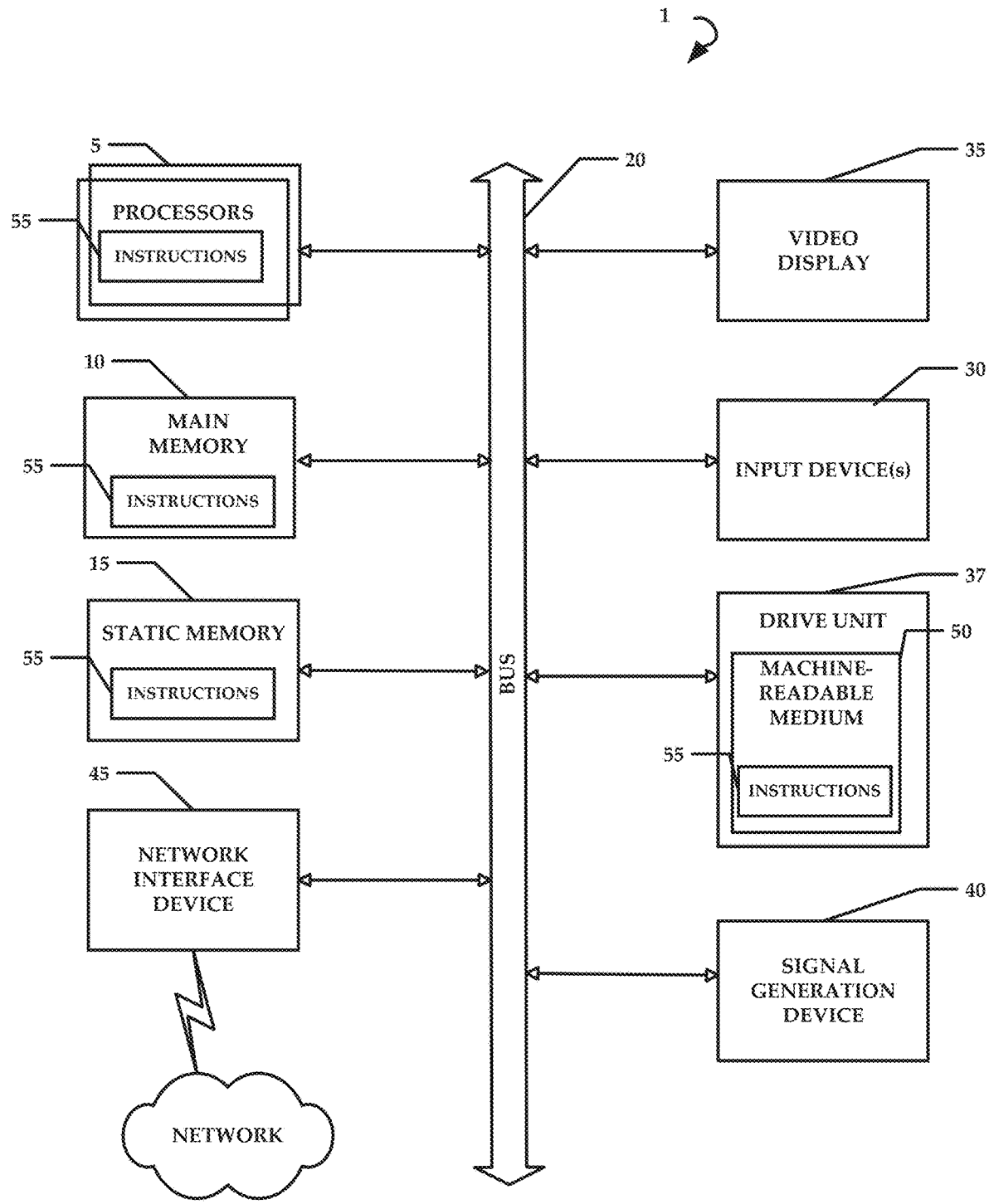

FIG. 31 is a diagrammatic representation of an example machine in the form of a computer system that may be used to practice the methods discussed herein.

BACKGROUND

Virtual spaces are immensely complex to create, even with the advent of many new technologies capable of taking advantage of such spaces, technologies like smartphones utilizing LIDAR (Light Detection and Ranging), virtual and augmented reality headsets and wearables. Even when a three-dimensional space is created, it is difficult to connect what occurs in a physical space to what occurs in a virtual space. The technologies presented herein provide for systems and methods to create three-dimensional spaces that are virtual versions or clone copies of physical spaces, these spaces may be created via a meta-binding spatial publishing platform that allows end-users to connect physical and virtual spaces for an interactive user-experience.

Current technologies are reliant on using augmented reality (AR) and virtual reality (VR) technologies currently have limited commercial use. This is because of the complexity of creating and updating a setting or environment for these technologies to be deployed at a consumer class level. This limited usage of virtual and augmented reality technology makes regular AR use unviable, too limited in function, and too complex for businesses to deploy. Furthermore, technologies or applications that provide AR or VR content are usually only able to be produced or modified by professional developers that must design the virtual space and objects within it. A common use-case such as a business that wants to provide customers with an interactive virtual experience cannot update, remove, or create their own virtual space without creating a new application based on specific algorithms or three-dimensional design studios.

Thus, the complexity of these technologies relates to the fact even when deployed, altering environments or spaces that may make use of these technologies too difficult for an average business or user. The spatial publishing platform presented herein makes these technologies usable and accessible to a wide user base.

In addition to the complexities of creating an environment usable by AR and VR technologies, interaction with virtual reality and objects in a virtual or augmented reality setting or space are cumbersome, and difficult, especially in indoor environments. Current technologies allow, via virtual reality kits, to detect images or specific objects to display in AR. However, the three-dimensional virtual spaces themselves (as well as objects within) are not linked to the user's location or the physical space. Machine learning models may also be used in some instances to detect or identify specific objects or images, but the functionality of these technologies is limited. What is needed is a simple means to generate and update overlay data, applications, and experiences to a physical space and for users to interact with the data, applications, and experiences a mobile device within the physical space.

DETAILED DESCRIPTION

In various embodiments, the systems and methods described herein facilitate the creation of virtual spaces that are based on physical spaces. These virtual spaces are virtual copies or clones of the physical space they represent and contain any or all objects that a user wants to include. The virtual space, any or all objects within the virtual space, as well as metadata linked and associated with the space or the objects are localized and able to be accessed by a user when the user is re-localized in the physical and virtual space via spatial queries, allowing the user to interact with the virtual space as they interact or move through its physical counterpart.

The physical space may be mapped into virtual spaces and allow consumers to interact with these spaces using various technologies and devices, including smartphones, computing devices, tablets, wearables such as smart glasses or AR/VR headsets and the like. Users may be the owners (also referred to herein as "operators" or "creators" of the space) or consumers, end-users that consume and interact with the virtual space created by the owners but generally with no control over altering or creating the space or objects within it.

The presented technologies provide a simple to use, scalable, technology agnostic, and real-time publishing platform that allows space owners to create and alter virtual spaces in real-time. In various embodiments, the presented systems and methods provide immersive virtual experiences that combine the use the virtual or augmented reality space with information, images, audio, video and connections with other applications and services. The publishing platform allows for the creation of a virtual space that is updatable with new or modified content that is easy to deploy and integrate with existing software applications. Further, the application can interact with a mobile device and the platform to provide a user the content, applications, and experiences based on their location in the physical space.

The technologies discussed are not limited to any operating system, software development language, data models or architecture, devices, or technology. The spatial publishing platform (referred to herein as "SPP") creates a virtual space and allows it to be attached to its physical counterpart. SPP allows owners to use a preset methodology to create any virtual space without having to undertake designs or programming. Furthermore, additional application and software layers may be built on SPP, including third party applications, to provide additional functionality, user, and developer customizations as well as different graphical interfaces. SPP may also be distributed as an SDK allowing it to plug-in to other application platforms, allowing its data and its functionality to be accessed from and by third party applications, systems, and devices.

In various embodiments, the SPP is supported by a content management system. A system operator may upload a three-dimensional map of a physical space to the content management system. The system operator may be anyone wishing to associate content with a physical location, such as a business owner selling merchandise or a venue manager looking to provide an interactive experience. The three-dimensional map may be a Computer Aided Design (CAD), blueprint, or other rendering.

The system operator may then scan the physical space and map positions in the physical space to the virtual counterpart in the three-dimensional map. In preferred embodiments, the mapping onto the virtual counterpart may be performed by overlaying the scan of the physical space. As needed, the scan may be oriented by matching a directional heading of the scan to a geometric heading on the three-dimensional map.

The scanning in such embodiments may be performed by any known method, including LIDAR, laser pulse-based 3D scanning, laser-triangulation 3D scanning, photogrammetry, or structured light scanning, among others.

In these and other embodiments, objects may be distinguished from planes in the geometric scan using point cloud data analysis methods, including point set registration, non-uniform rational basis-spline modeling (NURBS), Computer-Assisted Design (CAD) modeling, geometric mesh detection, and other known methods of converting point clouds to 3D surfaces.

The SPP system operator may then define anchors within the scanned image of the space. An anchor may be a point, a line, a plane, or a two-dimensional or three-dimensional shape as selected by the system operator. The system operator may then associate content with the anchor, such as an advertisement, hyperlink, media, or general information about the object located at or near the anchor.

In such embodiments, a user, such as a customer or patron, may enter the physical space and, through a user device, view the content associated with the anchor.

The SPP and the virtual spaces it creates can make use of any type of location tracking and positioning technologies that are available to the user and the physical and virtual spaces, including GPS, ultra-wide band, Wi-Fi assisted GPS, Apple and Google Indoor programs, radio frequencies from Wi-Fi signals, magnetometer position tracking, and Real-Time Location Services. The location of users, the orientation of a viewing or mobile device, and objects in virtual space may be updated in real time and provided to all applicable users and devices. Furthermore, SPP can utilize these technologies as well as create virtual spaces in indoor and outdoor locations.

SPP may provide various functionalities and use-cases. One use case is consumers walking through a physical space that is connected to a virtual map/model. The objects in the physical space have been anchored and tagged in virtual space, and may be accessed virtually through cameras, AR, or VR technologies. A consumer may walk around a store and interact with products, pull up information on anchored objects, and play videos, download documents, and receive recommendations or reviews of products.

Another use case may be a user in a museum. A user may walk around the museum space, able to interact with each piece of art present physically in a virtual setting. A user may, for example, via their smart glasses or phone or other smart viewing device, view or take a snapshot of an art object, and then access information, images, descriptions, audio tours and explanations and other media assets linked to each object.

In such embodiments, system operators may customize anchors, content associated with anchors, or virtual spaces as needed. For example, content accessible by shoppers may differ from content accessible to employees or managers for the same anchor or set of anchors. An employee may view purchase links and reviews for an item of merchandise, whereas an employee or manager may have the further option to view sales data or expected shipments.

These embodiments and others may further include customization options such as language, font size, or content tag size, as well as the nature of the content that can be viewed—for instance, content accessible to an adult may differ from content accessible to a child.

Another use case for SPP may be to control IOT devices or smart home technologies. A surveyor or owner can scan a room, and anchor specific objects or IOT devices, for example a smart light, camera, thermostat, and the like. The object in physical space is thus anchored in virtual space. The virtual space anchored object is then connected to or associated with an actionable control portal, IP address or other endpoint (for example connected to the device, or an API endpoint connected to a server that controls the device) that can be used to control the object, for example turn up the temperature of a thermostat. The user then via SPP may use their phone or other SPP capable device to interact with and/or control the physical object through its virtual anchored representation, e.g., turning up a light through a smartphone. This may provide a more reliable way to control physical objects in the surveys SPP physical space than current connection methods that rely on Wi-Fi, Bluetooth, or other radio technologies.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 presents a flow diagram of one embodiment of a method 100 to create a virtual space based on a counterpart physical one. An owner or operator first uploads or stores 105 a three-dimensional map of the physical space to SPP. In various embodiments, the three-dimensional map is recreated or turned into a map or model by SPP (two-dimensional or three-dimensional) when uploaded or stored in the system (referred to herein as "three-dimensional map/model"). Also, either SPP (automatically) or users setting up the system may identify specific survey regions in the uploaded map/model. These survey regions may also have one or more reference points, which may form one or more reference loci, on certain wall or floor planes set up or identified by the user or SPP. The one or more reference points or reference loci may identify features that can be defined in the 3-D model and identified by a device in the physical space. The reference points or loci may be a wall, where two walls meet, a door, a doorway, a point on the wall or doorway, a GPS coordinate, a distinct symbol on the physical structure, a visible or non-visible light beacon providing an encoded signature, or an RF-ID or NFC electronics device providing unique position data.

In this and related applications, reference points and reference loci may also be described as "reference anchors". These are distinct from content anchors, or "anchors" as the term is used in the present application. Reference anchor generally refers to reference points or reference loci used to align a survey region with an uploaded 3D model, while "content anchor" generally refers to object content tags set by operators within the 3D space. "Anchor" as used in the present application generally refers to content anchors unless context indicates otherwise.

Both the survey regions and the reference points or loci may be matched up with the results of a scan or survey conducted by a user or automatically by the system, as discussed in FIG. 1 and the rest of the document, allowing the map/model to be matched with the heading and alignment of the scan results. In some embodiments, the user enters the physical space that is a preset survey region in the three-dimensional map/model and is assigned coordinates in the region which match up to coordinates or points in the three-dimensional model, as the user moves and interacts with the space by scanning or otherwise moving through the space, then SPP matches the user's location and orientation with specific points in the three-dimensional map/model. The user may, in some embodiments, be re-localized in the virtual space and the three-dimensional model as the user moves through the physical space. The user then scans 110 the physical space, walking around scanning all walls, floors and ceilings with a visual sensor or camera utilizing AR technology, preferably a smartphone or computing device that employs LIDAR for most accurate results, and in some embodiments with a connected touch display, which may be part of the user/scanning computing device. As the user is scanning different surfaces and planes, SPP will distinguish between planes such as vertical walls, ceilings, and floors from objects such as cabinets, tables, plants and the like that are in the room (115). In one embodiment, SPP produces a geometric mesh polygon which is overlayed on the physical space that is scanned, and which can determine what is a plane versus what is an object. In one embodiment, to be able to orient the heading/directionality of the space scanned by the user to the three-dimensional map stored, the user can identify 120 a certain number of planes, preferably two or more walls by selecting or tapping them on the scanning computing device or smartphone. In some embodiments, when scanning a room, the system detects walls, and with data captured by the scan survey, the distance and angles between the walls and objects in the rooms could be matched automatically to the indoor map/pre-loaded map model. In these embodiments, a user is not required to identify either a vertical plane or a reference locus. For example, if a room is shaped like an octagon scanning the planes automatically allows the system to determine that the room is of an octagon shape. In some embodiments, detecting specific feature points of the room, including some of the wall planes e.g., a closet and a door, or spaces/distances between objects and/or walls allow the system to automatically match the pre-loaded three-dimensional map/model with what is scanned without having to align the mesh scan results and the three-dimensional map together with user assistance. In many embodiments, this automatic matching occurs by SPP finding or determining points of high confidence correlation between the AR scan/survey results and the pre-loaded map/model.

Once the user has identified 120 two or more vertical planes, SPP orients 125 the heading/directionality of the scanned and captured layout with that of the already stored three-dimensional map/model by using the identified planes in the scan to align the two headings, from the preloaded map and the AR scan together. The user then must identify 130 a reference locus, preferably at an intersection of three planes, i.e., two walls and a floor plane at their point of intersection. The user can identify the reference locus by tapping or selecting it on the scanning device or connected display. When the reference locus is identified 130, SPP aligns 135 the captured geometric layout with the pre-stored three-dimensional map via the identified reference locus. A virtual space that is a clone copy of the physical space with identical directionality and alignment is created, and may be pushed onto devices, published, or edited with reference points and metadata. In several embodiments, any of these steps may be combined into one or more steps. For example, step 120 and 130 may be one step where a user identifies two planes, such as two vertical planes, and then the reference point between the two planes and a floor plane and then link these up to the three-dimensional pre-saved/pre-uploaded model. Some of these may occur automatically, for example a user may select a reference point and the other planes around the point are automatically detected by SPP. In some embodiments, the user selects one or more planes and the other plane(s) and/or reference point are automatically detected and aligned with the three-dimensional model/map.

FIG. 2 presents a flow diagram 200 of one embodiment of a method for an owner to publish virtual spaces and associated content through SPP. A physical space is first surveyed 205. A survey may include one or more of the steps described in FIG. 1. Once the cloned virtual space map for the physical space is created, objects and the space may be described 210 by the owner or creator by using content anchors on objects and/or spaces. Content anchors allow users to identify segments or objects in the virtual space that align with their physical space counterparts. Once the virtual space is created, and spaces and objects within are described, the virtual space and associated content may be activated or published 215 by SPP and pushed out to SPP servers, databases, cloud systems or other data storage mechanisms.

SPP may also integrate 220 the captured and anchored data into third party platforms and applications via an SDK plugin. This allows end-users to access the captured virtual space and associated metadata by using weblinks, applications or other interfaces integrated with or with access to SPP. Owners may also add or update 225 anchors with new content, links, or media assets. Updates may be pushed 230 to SPP and changes are made immediately available in real-time, allowing end-users and consumers to access the updated virtual space and associated metadata immediately. Users that move through the physical space may be re-localized in the clone mapped virtual space of the physical space 235 by SPP as they move through the physical space, with their position and orientation identified and/or triangulated via any position, orientation or tracking technology and/or application, allowing re-localized users to interact with described physical space and objects.

FIG. 3 presents a flow diagram 300 of one embodiment of how objects may be anchored to the created virtual space and associated with content. An object that has already been mapped and localized in virtual space via surveying and mapping methods, including the exemplary method described in FIG. 1 is selected (or approached with a visual sensor or camera capable device) 305 by an owner. The owner/operator takes a snapshot 310 of the object via a camera capable device through SPP or the SPP application software. SPP then provides the owner the option to adjust 315 border lines (outline of the object anchor) that encompass the object, to set the shape (and outline) of the object anchor as described and shown in virtual space. An owner may then add or link 320 content, information, data, or media assets such as images, videos, audio, and the like to the object anchor. Content may be linked or added via dragging and dropping files or links into the object anchor through SPP. Optionally, when the owner wishes to update or make changes to the object or shape of the object, for example if a large table was replaced by a smaller table, the owner may, through SPP, adjust 325 the border lines/shape surrounding the object, causing the shape of the object to change in virtual space. The owner may also remove or add, increase, or decrease the border lines to make these changes. When these changes are saved by the owner, the changes are saved in the database or the data folder/file where the virtual space is located, these changes are then instantly accessible by all users of the platform. Furthermore, content linked or associated with anchored objects may also be edited, added, or removed 330 by the owner. New links can be created, new content added, or existing content and/or information may be altered, all of which are instantly accessible by users of the space in real-time.

FIG. 4 presents one embodiment of a method 400 for a consumer/end-user of a virtual space to interact with the space. When a user enters a mapped physical space, the user is localized in virtual space, via GPS, ultra-wide band, Wi-Fi assisted location tracking and/or any other tracking, or positional technologies accessible by the user and/or available to the physical space. Once the user is localized in physical space, they are re-localized in the cloned three-dimensional virtual space. A re-localized user moving through and interacting with these spaces may be tracked by SPP by being triangulated with one or more tracking or positional technologies and continuously re-localized. The user may approach a mapped and described object in the physical space and take a snapshot 410 of it through a camera enabled device via SPP and/or linked or associated applications. SPP re-localizes the user and records 415 the orientation and position of their device in the virtual space. This information can be saved on SPP, usually in a server, database, or another storage mechanism such as a cloud or serverless system. The snapshot is aligned 420 with the user device/camera position and orientation, which has been undergoing continuing re-localization in relation to both the physical and virtual maps/spaces as the user moves through the physical space. This allows SPP to determine what object is being viewed by the user in the snapshot.

When the user accesses the snapshot or image taken via SPP, SPP or associated/linked applications provide 425 the user with the metadata and media content that is linked to the object that is visible/being viewed in the snapshot. The user may scroll through the linked content or access them directly. Some of these media assets and content can also redirect the user to other websites, weblinks and/or applications. Additionally, if the object anchor is updated by the owner/operator with new information, links, content media assets or other data, then the linked metadata and media content associated with the object anchor are also updated and the new content/media assets/information is provided 430 to the user. In several embodiments, these snapshots may also be shared with other users along with the attached/linked data and media assets. In some embodiments, a snapshot may be accessed by a user remotely, for example a user takes a snapshot of their kitchen, and then walks into a store or find an SPP virtual asset online or on the SPP application/related applications, and the user is able to use the snapshot from SPP to model the virtual asset in the snapshot of the kitchen. A user may also walk into a store and take a snapshot of an item or product in a physical location and match the two snapshots together, or model one snapshot inside the other via SPP.

FIG. 5. presents an embodiment of a method 500 to localize a user in a mapped virtual location. Using the GPS on a user's smartphone, wearable, or other computing device, SPP is queried 505 to receive all nearby locations that are part of SPP. SPP provides all nearby locations to the user, along with their location ID's, distance to each location (from the user device) as well as metadata or a summary of metadata linked or associated with each location. The user selects a location and SPP is queried again 510 to return the geometries of all saved anchors in the selected location. This may be downloaded manually or automatically to the user's application, or device. The device's position is re-localized 515 based on its position and orientation in the map, via any location and positional tracking technologies, including the ones discussed in this document. Once the user's device is re-localized, then all nearby anchors are pinged, or hit tested 520 with available and active anchors, with data being sent from any responsive anchors, allowing the user's device to receive a list of all nearby anchors 520. SPP is then queried to receive mappings of all documents to the active and available anchors in the received anchor list 525, and for each document or asset linked to an anchor, SPP is queried again 530 to allow or initiate download of documents.

FIG. 6 presents one embodiment of a three-dimensional map model 600 created by surveying a physical space. An interface shows a selection of different models 605, linked metadata and objects related to the mapped space 610, location map 615 as well as editable virtual space model information 620. In various embodiments, a three-dimensional model like this along with connected and anchored objects and scanned spaces within the three-dimensional model may be linked or connected to a non-fungible token (NFT). The NFT may for example be used to authenticate the owner of the floor plan and provide information as to its geolocation and be used to ensure that any virtual asset in SPP or other virtual spaces are linked to and owned by the NFT owner. NFTs may also be used to authenticate or verify SPP users who wish to access floorplans, settings, objects or other models saved to the system. Other blockchain technologies may also be used to authenticate users and owners of virtual spaces linked to physical locations, as well as objects within those spaces. Transactions can occur in virtual space where anchored objects may be linked to specific tokens or blockchain authentication methods and may be transferred to SPP users as or along with their linked tokens, when the physical object is bought or sold. Different NFTs and tokens may be used for different access levels for each model/virtual space, for example between owners and administrators, each of which own or are linked to separate NFT tokens.

FIG. 7 presents a view of the survey window on the SPP application, once a user initiates a survey of a physical space using AR technology, and in some embodiments by using LIDAR capable devices.

FIG. 8 presents the surveying and scanning process in progress. As can be seen mesh detection is used to cover the ground 810 as well as objects 820 in the physical space, while vertical walls 830 are identified separately by white virtual polygon shapes covering the plane.

FIG. 9 presents another view of the physical space during the surveying and scanning in progress.

FIG. 10 presents another view of the physical space during the surveying and scanning in progress. Vertical planes such as walls are identified by the scanner and overlayed by white polygons 1010. The user may select the white planes covering the walls or tap them (on a touch screen or the recording device/smartphone/tablet) to identify walls during the scan. This is necessary to orient the heading and directionality of the AR survey with a separately pre-stored/uploaded three-dimensional model/or a map of the physical space.

FIG. 11 presents another view of the physical space during the surveying scan in progress. A vertical plane such as wall 1110 is covered by and overlayed by white polygon shaped to the wall. The user may select the white planes covering the walls or tap them (on a touch screen or the recording device/smartphone/tablet) to identify walls during the scan. This is necessary to orient the heading and directionality of the AR survey with a separately pre-stored/uploaded three-dimensional model/map of the physical space.

FIG. 12 presents another view of the survey scan in progress. A user must identify a reference point or reference locus 1200 that is at the meeting point of three planes (i.e., two vertical walls and the horizontal floor). This could also be done automatically by SPP when the system finds high correlation between areas and results in a scan with the preloaded map/model. The reference point or reference locus 1200 is selected by the user with a tap or any other gesture or method on a computing or touchscreen capable device to indicate the exact point. Once the reference point or reference locus is indicated/selected then the AR map may be aligned accurately to a prestored/pre-uploaded model or map of the physical space.

FIG. 13 presents another view of the survey scan showing the reference point or reference locus 1200. The model that is displayed in this figure is the three-dimensional prestored or pre-uploaded map which the AR scan uses to align the mapped scan data to (or a recreation by SPP based on the three-dimensional model uploaded to SPP). On SPP the user may switch from a view of the AR scan (FIG. 12) to a view of the same location in the three-dimensional map as the survey scan is in progress. As can be seen the user is taken to the same position on the map as they are on the AR scan with reference point or reference locus 1200.

FIG. 14 presents a top view of a combined AR scan and three-dimensional map/model, once the AR scan is overlayed and aligned with the three-dimensional model. As can be seen the AR map is aligned with the model by using the reference point or reference locus 1200 to align the AR scan mesh data to the three-dimensional model. The three-dimensional model is originally pre-uploaded or pre-stored and recreated by SPP, and then overlayed by the AR scan.

FIG. 15 presents a first-person view of the combined AR scan and three-dimensional map model.

FIG. 16 presents a first-person view through the application running SPP after the AR scan and three-dimensional map are oriented and aligned together. Here the viewer displays a viewing tracker 1610 that hovers over identified objects 1620 that were captured and mapped by the AR scan and exist in the physical space and highlighted to the user.

FIG. 17 presents a first person view through the application running SPP after the AR scan and three-dimensional map are oriented and aligned together. Here the viewer displays a viewing tracker 1710 that hovers over the ground 1720. Unlike in FIG. 16 where the tracker lights up when hovering over a scanned object on the wall, the ground is recognized as a plane by the AR scan and therefore does not light up when the user's tracker is hovering over it.

FIG. 18 presents a first person view through the application running SPP after the AR scan and three-dimensional map are oriented and aligned together. Here the viewer displays a viewing tracker 1810 that hovers over identified objects 1820 that were captured and mapped by the AR scan and are lit up or highlighted to the user.

FIG. 19 presents one view of an embodiment of creating an object anchor or anchoring an object for a mapped physical space. Here the object 1920 has its shape, limits or borders in the virtual space defined by a customizable object anchor 1910. Anchor 1910 may be toggled or initiated by the user and set to any size of shape once it appears, as defined by its polygenic borders. The user has to merely click and drag the anchor 1910 to expand or reduce its size via a convenient user interface.

FIG. 20 presents another view of anchoring an object. In this instance an anchor 2010 is created to surround and define the shape of picture frame object 2020 as defined by expandable anchor borders 2015.

FIG. 21 presents a first-person AR view of a tracker 2110 hovering over scanned, mapped, and highlighted object 2120.

FIG. 22 presents a top three-dimensional model view of FIG. 21. As can be seen user/user device 2130 is mapped, tracked, and localized on the three-dimensional map model 2200. The map model 2200 includes the tracker 2110 as well as the object 2120 as shown in FIG. 21. The user may toggle in and out from this three-dimensional map view to the first person view in FIG. 21.

FIG. 23 presents another three-dimensional map view of a user that is localized in a surveyed and mapped physical space.

FIG. 24 presents an image of one embodiment of a user interface listing all object anchors that have been created, which include information of the number of documents linked to each anchor.

FIG. 25 presents a view of a combined three-dimensional map and surveyed space. This is a virtual space SPP produced clone to the physical space.

FIG. 26 presents another view of an SPP interface 2600 showing an SPP virtual map model 2640. An office plant object 2610 is displayed in the model 2640 as a result of overlaying and aligning the AR scan survey with a three-dimensional map and is also displayed in snapshot 2620. The object 2610 has been anchored. Snapshot 2620 is displayed to the side of the screen. The snapshot 2620 may be one just taken, currently being taken, or placed in the frame, or a snapshot from previous surveys, which has been linked by SPP to the anchored object. Snapshot 2620 as well as the map model both include object anchor borders 2630 that define the object in virtual space.

FIG. 27 presents another view of an SPP interface 2700 showing an SPP virtual map model 2740. As can be seen Balenciaga object 2710 is displayed in the model 2740 and in snapshot 2720. Balenciaga object 2710 has been anchored. Object anchor borders 2730 are displayed in both model 2740 and snapshot 2720.

FIG. 28 presents another view of an SPP interface 2800 showing an SPP virtual map model 2840. As can be seen a library prints object 2810 is displayed in the model because of overlaying and aligning the AR scan survey with a three-dimensional map. Snapshot 2820 as well as the map model 2840 both include the object anchor borders 2830 defining the library print object in virtual space.

FIGS. 29A-29C present images that show the consecutive steps in editing or altering an anchor and its borders and how this is updated and displayed to users. User interface 2900 includes a three-dimensional virtual model 2910 of the space, a snapshot 2920 of the selected object. Object anchor metadata screen 2930 may be displayed on a user device 2940. Object anchor metadata screen 2930 may include a 2D map 2950 displaying the location of the object in relation to the rest of the map model 2910 as well as a list of linked files, tags, documents, and media assets. An owner may edit or adjust an object anchor (or anchor borders) 2960 by changing the size or shape of the object anchor 2960 on user device 2940. In FIG. 29A we see a large sized object anchor 2960, with an expanded border that encompasses the displayed plant. FIG. 29B shows edit shape button 2970 on the user device 2940. Once the user selects edit shape button 2970, the user is taken to an edit anchor shape screen 2980 where the user may click and drag or otherwise resize or reshape the edit screen object anchor/anchor borders 2990. The edit screen anchor borders 2990 are reduced in size compared to object anchor borders 2960. Once the user saves, via button 2995, the modification made to reduce the object anchor borders 2960, which define the object in virtual space, then as can be seen in FIG. 29C, object anchor borders 2960 become correspondingly smaller on the snapshot 2920 as well as on the map model 2910. An owner/operator may change or edit anchors, anchor sizes, associated links, files, media assets, or documents all in real-time and these changes are instantly accessible and viewable by SPP customers and end-users.

Figure 30A:
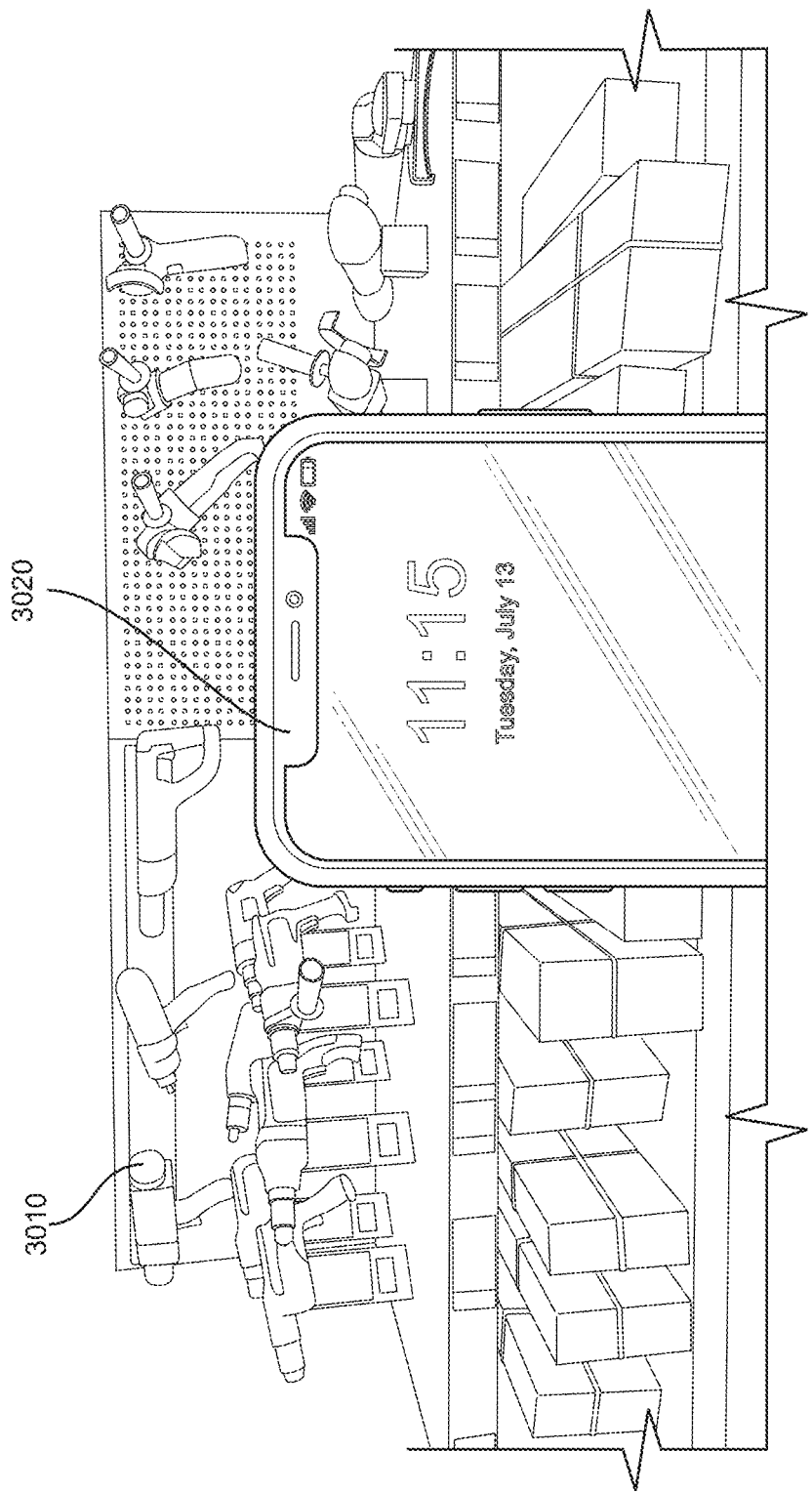
Figure 30B:
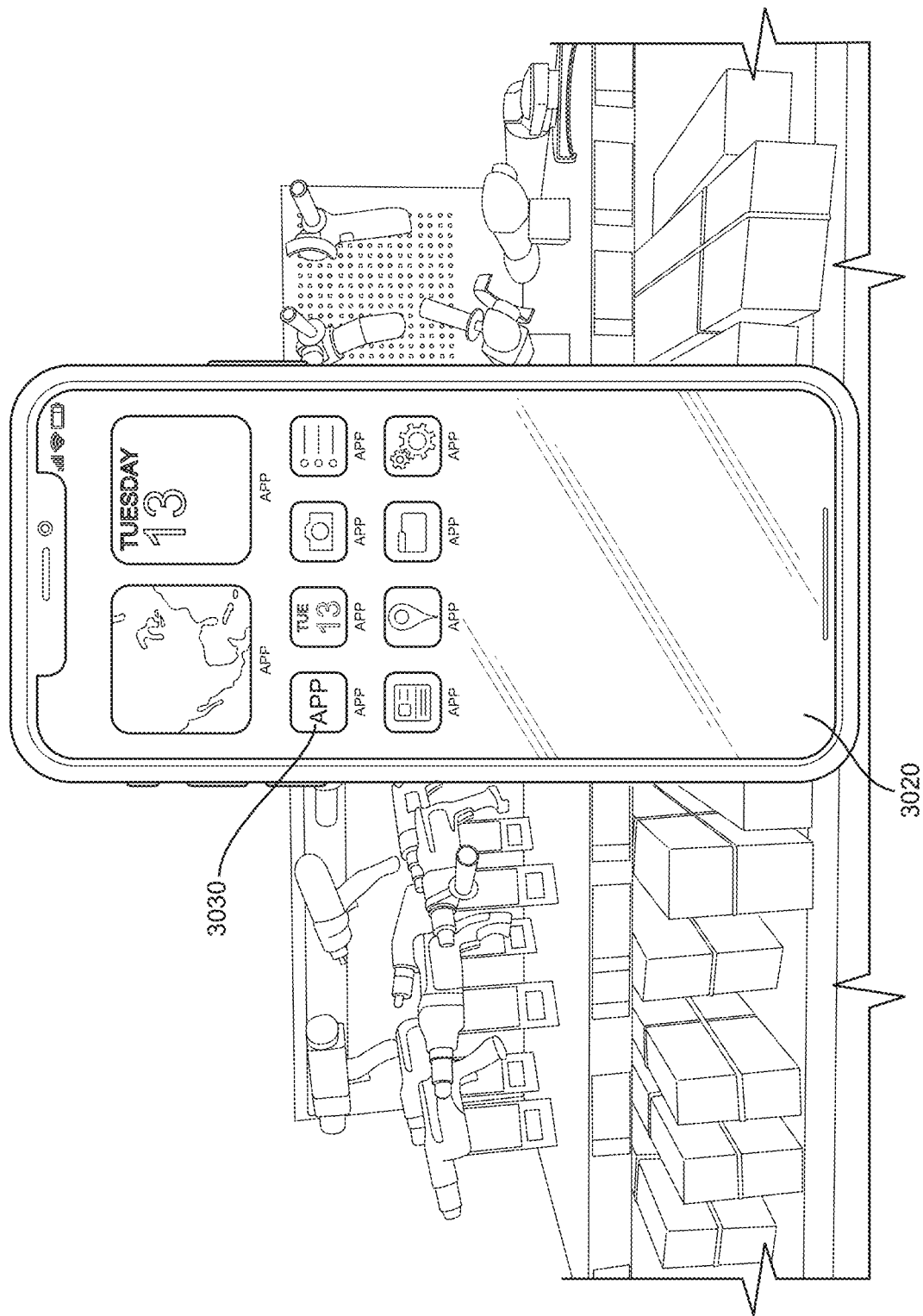
Figure 30C:
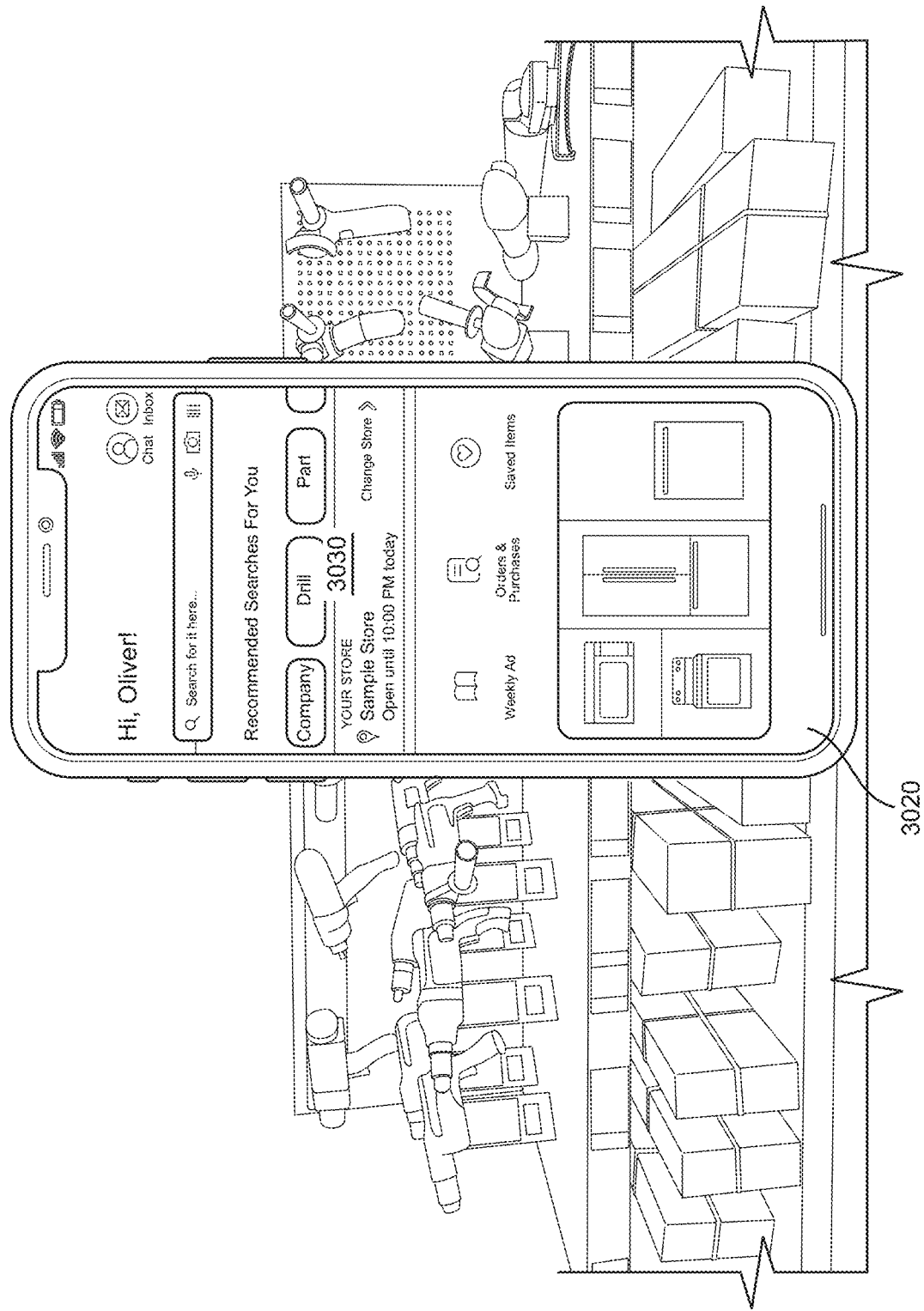
Figure 30D:
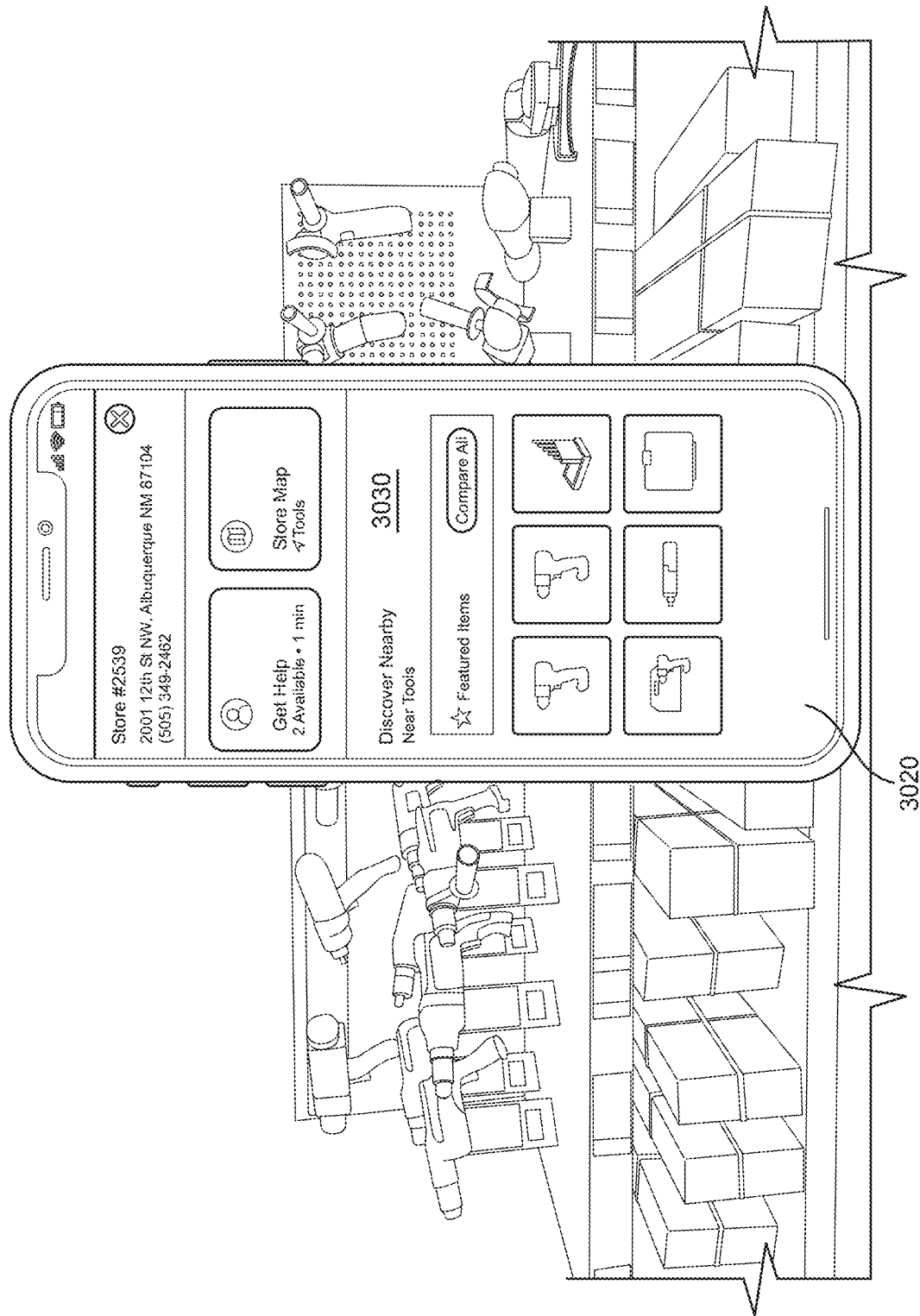
Figure 30E:
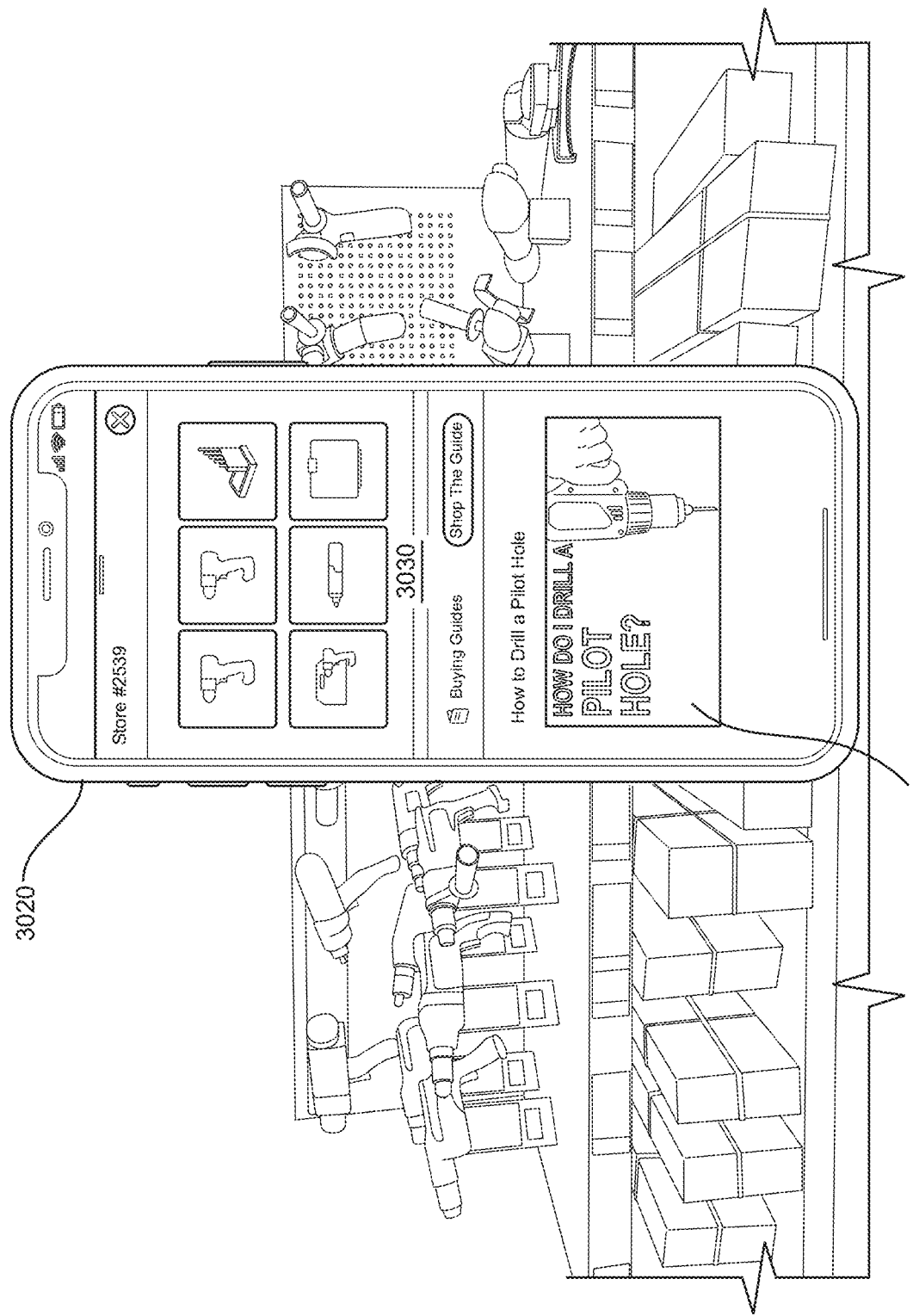
Figure 30F:
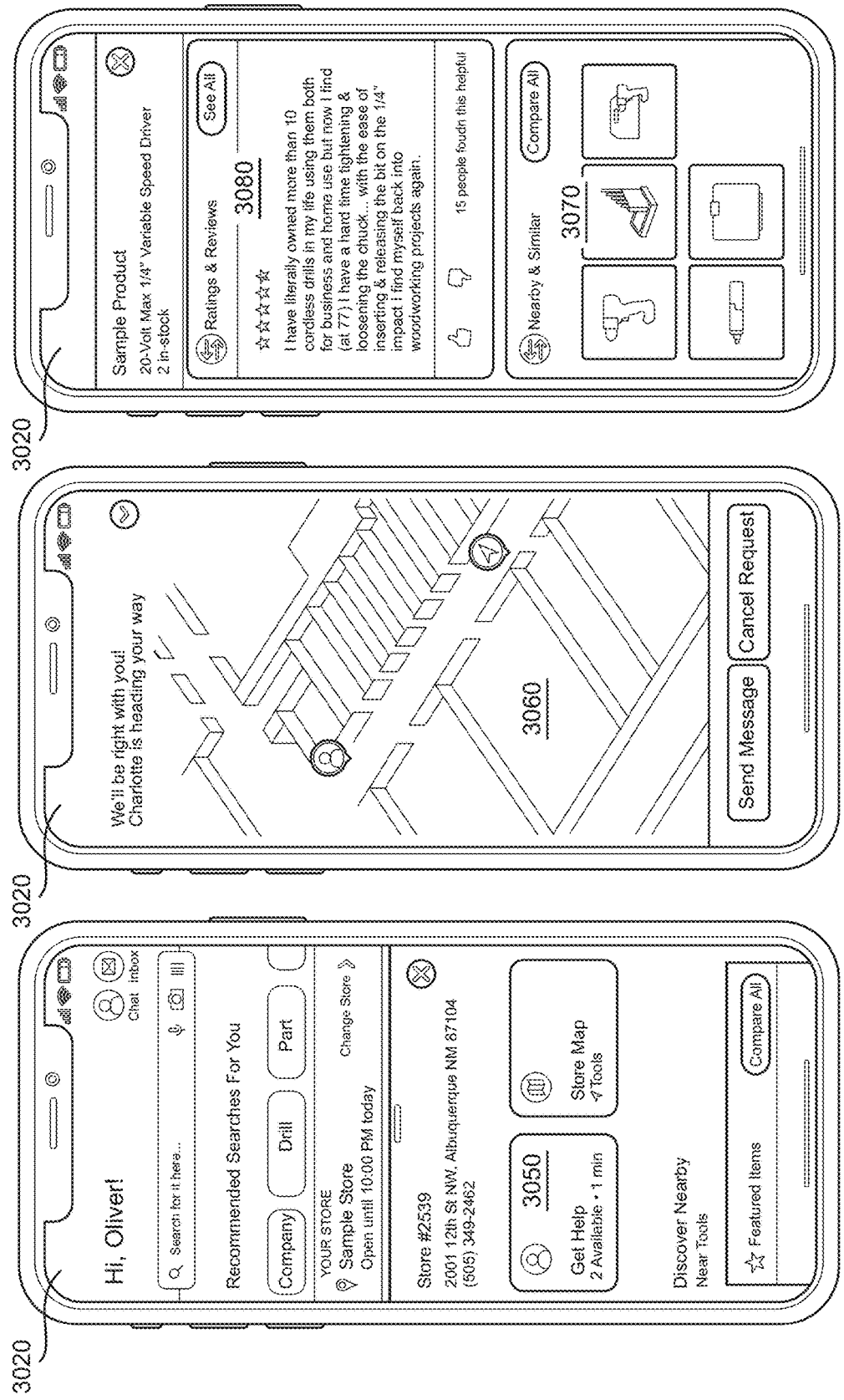

FIGS. 30A-30F present a view of the customer-user experience when interacting with the SPP platform virtual space while navigating mapped physical space. In this image, the customer/user is facing a shelf 3010 with products for sale in a retail store and pointing the user device 3020 at shelf 3010. In FIG. 30B the customer is navigating the user device 3020 to find the application 3030 that is connected to SPP through a plug-in or SDK. FIG. 30C displays the retail application 3030 being accessed on user device 3020. The application 3030 connected to SPP has localized the user's position and direction they are facing in the store and has determined what anchor the user device is facing either through the user scanning or taking a snapshot of the shelf 3010 with user device 3020, or via continuous re-localization of the user's exact position and orientation. This re-localization may occur through very precise technologies such as ultra-wide band. In FIG. 30D the application 3030 displays metadata, links, and related information to the products on shelf 3010 to the user. As the user scrolls down application 3030 on user device 3020, other documents become visible, such as a linked buying guide 3040 with attached video media assets to demonstrate how to use the products being viewed by the user, as is displayed in FIG. 30E. FIG. 30F displays other functionalities that may be available by third party software or plugins that may be built on top of or and augment the underlying SPP provided. In FIG. 30F. application 3030 can display other information and provide for additional actions to or interactions to be activated with the virtual or physical spaces. For example, the user may request help 3050 wherein a map 3060 of the store is displayed to the user on the application 3030 with updates tracking an assistant in real-time approaching the user's location. The user may also look for and be shown nearby or related products 3070 in the store, as well as reviews on these and other anchored products 3080.

FIG. 31 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The components provided in the computer system 1 are those typically found in computer systems that may be suitable for use with embodiments of the present disclosure and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network 70 via the network interface device 45 utilizing any one of several well-known transfer protocols (e.g., Hyper Text Transfer Protocol (HTTP)). While the machine-readable medium 50 is shown in an example embodiment to be a single medium, the term "computer-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/ acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 1, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.
The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

Operational Example

Below is described one embodiment of the operation of the invention. This embodiment allows a person with a smartphone to be able to move around a physical space and access digital content related to the space to have a more immersive, entertaining, or informative experience. If the physical space is a grocery store, then the content can include but is not limited to product information, promotion information, how-to-use videos, coming products, and back orders. This content is made available to a smartphone when the device is proximately located and oriented towards the area where a product is located.

The smartphone can download an application associated with one or more stores or one or more physical areas. The application communicates the smartphone's location and orientation to a SPP utilizing the smartphone communication and positioning features. The orientation of the smartphone is assumed to be where a person utilizing the smartphone is looking is typically what is displayed on the smartphone's screen. The SPP translates the physical location of the smartphone to virtual location within a 3-D model.

The 3-D model is generated before being used by a smartphone. The model can start with a CAD (computer aided design) drawings of a physical space. The CAD drawing may only contain the outer walls, doors, pillars and other major structural details. One key aspect of this CAD drawing is that they are accurate in their dimensions and associated with a physical location and a physical orientation. This information is needed so that information about where a smartphone is in a physical location can be associated with a location within the 3-D model.

Next a scan of the physical location can be performed. The scan can use any known scanning technology including but not limited to LIDAR. For a store, this step picks up details including shelving and products on the shelf. For a museum, scan details include but are not limited to paintings on the walls, sculptures, and benches are determined. These scans are then overlaid onto the 3-D CAD drawings.

The next step is to define anchors within the 3-D CAD drawings with the scan space overlay. The anchors can be areas of varying geometry. For example, the anchor can be virtual 3-D boxes the encompasses a shelf within a store. Or the anchor can be a two-dimensional rectangle on the wall of the museum where a painting is locate. The configuration will further continue with digital content being attached to the anchors or to a position relative the anchor. For example, the wall in a museum could have multiple anchors or could have one anchor, being a point, a line, or the intersection of two lines or planes. The digital content can be attached to the anchor or relative to the anchor. Note, the scan that is overlaid on the 3-D CAD drawing is used to help the person configuring the system to know where they are within the space so that anchors can be accurately placed.

The smartphone application can indicate access to the digital content in different ways. In one implementation the smartphone camera is use where an indication of the content is overlayed on the smartphone screen using augmented reality to indicate content related to an anchor or anchor space. The smartphone application could further use image recognition technology to recognize an item within an anchor space to better place the content indication in the augmented reality overlay. For example, the anchor might be a shelf containing a product along with other products. The content indication could show a "reel" for a video clip or a different symbol for an audio clip or a picture. If the content is related to how to use a specific product, then the image recognition could be used to place the augmented reality overlay on the correct product within the content anchor. Further, if there are multiple digital contents associated with a specific content anchor, image recognition on the smartphone or from images or video sent back to the SPP can be used to place augmented reality content indicators with the associated product.

In a simpler implementation, the smartphone display may show a button on the display to activate the content. The button or other access indicator appears when the smartphone is within a predetermined proximity of the anchor point or anchor point offset. For example, this could be set to six feet. Further, the smartphone may need to be orientated towards the anchor or anchor offset for the indicators to be displayed or enabled.

Note that the smartphone, when connecting with the SPP might send information and preferences back to the SPP. For example, a language preference might be sent back and digital content associated with that language be used. Or is the person has hearing or sight impairment, the video or audio file, with subtitles, magnification, sound level, sound enhancement or other adjustments to assist with utilizing may be used. Or content for younger people may As the user with the smartphone moves around the physical space, it sends to the SPP its position and orientation back to the SPP server. Further image and video from the smartphone camera may also be sent back to the SPP server. The server determines where the smartphone is in the virtual 3-D CAD and whether the smartphone is close to, orientated at, or a combination of both, to an anchor or anchor offset. When these conditions are met, the SPP then sends to the smartphone an indication of the available digital content to the smartphone. The user then selects and enables the content that is seen, heard or both on the smartphone. Note, the invention contemplates that the entire 3-D model with the scan overlays and content are downloaded to the smartphone or other mobile device. In that aspect of the invention, the smartphone does not have to communicate with the SPP after the application is downloaded to the smartphone. The phone determines its position within the physical space, performs the mapping to the virtual 3-D space, determines if the phone is proximate and oriented to an anchor and provides access to the associated content.

What is claimed is:

1. A system for creating and using a 3D virtual space based on physical locations and objects to facilitate virtual interactive experiences, the system comprising:
   a content management system, the content management system supporting a three-dimensional map of a physical space;
   an operator scanning device, the operator scanning device configured to scan the physical space;
   a processor and a memory communicatively coupled to the processor, the memory storing instructions which when executed by the processor perform a method, the method comprising:
      overlaying a geometric layout onto the three-dimensional map of the physical space, the geometric layout being generated by the operator scanning device scanning a physical space;
      defining an anchor and at least one user-customizable anchor border in the three-dimensional map;
      associating a content with the anchor;
      receiving, from a user device within the physical space, the user device's physical location and orientation;
      determining the user device's location within the three-dimensional map; and
      outputting to the user device, the anchor, the at least one user-customizable anchor border, and the content associated with the anchor when the user device is near and orientated with the anchor.

2. The system of claim 1, the instructions further comprising differentiating between planes and objects in the scanning of the physical space, the objects being identified using point cloud data analysis.

3. The system of claim 2, the point cloud data analysis including geometric mesh detection.

4. The system of claim 1, further comprising the operator scanning device using optical scanning, laser pulse-based scanning, laser triangulation, photogrammetry, structured light scanning, or any combination thereof.

5. The system of claim 1, wherein the orienting is determined using a directional heading of the geometric layout with a directional heading of the three-dimensional map.

6. The system of claim 5, further comprising:
   receiving from a user, a reference locus at an intersection of three planes, the reference locus being used for aligning the directional heading of the geometric layout with the directional heading of the three-dimensional map.

7. The system of claim 6, wherein the three planes comprise two wall planes and a floor plane.

8. The system of claim 1, wherein the anchor is comprised of at least one point, line, plane, two-dimensional shape, or three-dimensional shape in the three-dimensional map, or any combination thereof.

9. The system of claim 1, wherein the user device is a smartphone, computing device, tablet, smart glasses, or augmented reality/virtual reality headset.

10. The system of claim 1, further comprising the user device's physical location being determined by a Global Positioning System application, ultra-wide band, Wi-Fi systems, magnetometer position tracking, or Real-Time Location services, or any combination thereof.

11. The system of claim 1, further comprising:
   providing at least one user-selectable user-interface element for activating displaying of the anchor, the at least one user-customizable anchor border, and the content or an indication of the content associated with the anchor.

12. The system of claim 1, wherein the three-dimensional map is a received Computer Aided Design drawing.

13. A method for creating a 3D virtual space based on physical locations and objects to facilitate virtual interactive experiences, the method comprising:
   generating a geometric layout by scanning a physical space;
   overlaying the geometric layout onto a three-dimensional map of the physical space, the three-dimensional map being supported by a content management system;
   defining an anchor and at least one user-customizable anchor border in the three-dimensional map;
   associating a content with the anchor;
   receiving, from a device within the physical space, the device's physical location and orientation;
   determining, by the content management system, a device location within the three-dimensional map; and
   outputting to the device, the anchor, the at least one user-customizable anchor border, and the content associated with the anchor when the device is near and orientated with the anchor.

14. The method of claim 13, further comprising differentiating between planes and objects in the scanning of the physical space, the objects being identified using point cloud data analysis.

15. The method of claim 14, the point cloud data analysis including geometric mesh detection.

16. The method of claim 13, further comprising the orienting being determined using a directional heading of the geometric layout with a directional heading of the three-dimensional map.

17. The method of claim 13, wherein the anchor is comprised of at least one point, line, plane, two-dimensional shape, or three-dimensional shape in the three-dimensional map, or any combination thereof.

18. The method of claim 13, wherein the device is a smartphone, computing device, tablet, smart glasses, or augmented reality/virtual reality headset.

19. The method of claim 13, wherein the device's physical location is determined by a Global Positioning System application, ultra-wide band, Wi-Fi systems, magnetometer position tracking, or Real-Time Location services, or any combination thereof.

20. The method of claim 13, wherein the content includes hyperlinks, media, or product or object information, or any combination thereof.

21. The method of claim 13, further comprising:
   providing at least one user-selectable user-interface element for activating displaying of the anchor, the at least one user-customizable anchor border, and the content or an indication of the content associated with the anchor.

22. The method of claim 13, wherein the three-dimensional map is a received Computer Aided Design drawing.

23. A method for using a 3D virtual space based on physical locations and objects to facilitate virtual interactive experiences, the method comprising:
- entering a physical space, the physical space having a virtual space counterpart stored in a content management system;
- viewing, by a user device, a physical object at a location in the physical space, the location having a virtual location counterpart in the virtual space counterpart, the physical object having an anchor and at least one user-customizable anchor border at or near the virtual location counterpart;
- scanning the physical object by way of the user device;
- transmitting results from the scanning to the content management system, the results being linked to the anchor; and
- retrieving, from the content management system, a content associated with the physical object.

24. The method of claim 23, further comprising the virtual space counterpart being created by an operator of the physical space by the method comprising:
- generating a geometric layout by scanning a physical space;
- overlaying the geometric layout onto a virtual three-dimensional map of the physical space, the three-dimensional map supported by the content management system;
- defining the anchor in the three-dimensional map;
- associating a content with the anchor;
- receiving, from a device in within the physical space, the device's physical location and orientation;
- determining, by the content management system, a device location within the three-dimensional map; and
- outputting to the device, when the device is near and orientated with the anchor, the content associated with the anchor or an indication of the content associated with the anchor.

25. The method of claim 24, further comprising the orienting being determined using a directional heading of the geometric layout with a directional heading of the three-dimensional map.

26. The method of claim 24, wherein the device's physical location is determined by a Global Positioning System application, ultra-wide band, Wi-Fi systems, magnetometer position tracking, or Real-Time Location services, or any combination thereof.

27. The method of claim 24, wherein the virtual three-dimensional map is a received Computer Aided Design drawing.

28. The method of claim 23, wherein the user device is a smartphone, computing device, tablet, smart glasses, or augmented reality/virtual reality headset.

29. The method of claim 23, wherein the content includes hyperlinks, media, or product or object information, or any combination thereof.

30. The method of claim 23, further comprising:
- taking a snapshot of the physical object; and
- accessing or viewing the content associated with the physical object within the snapshot.

31. The method of claim 23, further comprising:
- providing at least one user-selectable user-interface element for activating displaying of the anchor, the at least one user-customizable anchor border, and the content or an indication of the content associated with the anchor.

* * * * *